United States Patent
Ko et al.

(10) Patent No.: US 9,432,099 B2
(45) Date of Patent: Aug. 30, 2016

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Hyunsoo Ko, Anyang-si (KR); Jaehoon Chung, Anyang-si (KR); Sunam Kim, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/649,189

(22) PCT Filed: Jun. 24, 2013

(86) PCT No.: PCT/KR2013/005538
§ 371 (c)(1),
(2) Date: Jun. 2, 2015

(87) PCT Pub. No.: WO2014/088174
PCT Pub. Date: Jun. 12, 2014

(65) Prior Publication Data
US 2015/0318908 A1 Nov. 5, 2015

Related U.S. Application Data

(60) Provisional application No. 61/732,405, filed on Dec. 3, 2012.

(51) Int. Cl.
*H04L 25/49* (2006.01)
*H03D 1/04* (2006.01)
(Continued)

(52) U.S. Cl.
CPC .......... *H04B 7/0421* (2013.01); *H04B 7/0456* (2013.01); *H04B 7/0478* (2013.01); *H04B 7/0617* (2013.01); *H04B 7/0626* (2013.01); *H04L 1/00* (2013.01); *H04L 5/00* (2013.01)

(58) Field of Classification Search
USPC ........................ 375/219, 220, 221, 222, 240,
375/240.26–240.27, 285, 259, 295, 296,
375/302, 304, 316, 322, 323, 324, 340, 346,
375/349
See application file for complete search history.

(56) References Cited

U.S. PATENT DOCUMENTS 8,660,060 B2 * 2/2014 Sanayei ............... H04B 7/0417
370/321
8,971,272 B2 * 3/2015 Kim ....................... H04B 7/024
370/329

(Continued)

FOREIGN PATENT DOCUMENTS

| KR | 10-2008-0017239 | 2/2008 |
| KR | 10-2009-0066198 | 6/2009 |
| KR | 10-2010-0091330 | 8/2010 |

OTHER PUBLICATIONS

Alcatel-Lucent Shanghai Bell, et al., "Consideration on CSI feedback Enhancements for high-priority antenna configurations, "3GPP TSG-RAN WG1 #66, R1-112420, Aug. 2011 7 pages.*

(Continued)

*Primary Examiner* — Linda Wong
(74) *Attorney, Agent, or Firm* — Lee Hong Degerman Kang & Waimey; Jonathan Kang; Jeffrey Lotspeich

(57) ABSTRACT

The present invention discloses a method and an apparatus for reporting channel state information. According to one embodiment of the present invention, receiving a channel state information-reference signal (CSI-RS) based on CSI-RS setting information that is provided by a base station; and reporting to the base station the CSI generated by using the CSI-RS, wherein the CSI includes precoding information selected from a specific codebook, wherein elements of the specific codebook are configured based on a precoding vector W, wherein the precoding vector W is $$W = \begin{bmatrix} W1 \\ aW2 \end{bmatrix},$$

W1 is a precoding vector applied to a first domain antenna group having a 2D antenna structure, W2 is a precoding vector applied to a second domain antenna group having the 2D antenna structure, and wherein "a" can be a value representing phase difference between the first domain antenna group and the second domain antenna group.

8 Claims, 17 Drawing Sheets

(51) Int. Cl.
*H03K 5/01* (2006.01)
*H04B 1/10* (2006.01)
*H04B 7/04* (2006.01)
*H04B 7/06* (2006.01)
*H04L 1/00* (2006.01)
*H04L 5/00* (2006.01)

(56) References Cited

U.S. PATENT DOCUMENTS

| | | | | |
|---|---|---|---|---|
| 2008/0051150 | A1* | 2/2008 | Tsutsui | H04B 7/0634 455/562.1 |
| 2012/0087230 | A1* | 4/2012 | Guo | H01Q 3/267 370/208 |
| 2012/0093258 | A1* | 4/2012 | Suh | H04B 7/0671 375/295 |
| 2012/0314792 | A1* | 12/2012 | Tesanovic | H04B 7/0639 375/267 |
| 2013/0272206 | A1* | 10/2013 | Li | H04B 7/024 370/328 |
| 2013/0287064 | A1* | 10/2013 | Seo | H04J 13/18 375/144 |
| 2014/0086155 | A1* | 3/2014 | Chen | H04B 7/0626 370/329 |
| 2014/0233557 | A1* | 8/2014 | Seo | H04W 56/00 370/350 |
| 2014/0341312 | A1* | 11/2014 | Lee | H04L 1/06 375/267 |

OTHER PUBLICATIONS

Alcatel-Lucent Shanghai Bell, et al., "Considerations on CSI feedback enhancements for high-priority antenna configurations," 3GPP TSG-RAN WG1 #66, R1-112420, Aug. 2011, 7 pages.

Pantech, "Remaining issues on CSI-RS for DL CoMP," 3GPP TSG RAN WG1 Meeting #69, R1-122449, May 2012, 3 pages.

PCT International Application No. PCT/KR2013/005538, Written Opinion of the International Searching Authority dated Sep. 26, 2013, 16 pages.

* cited by examiner

FIG. 5
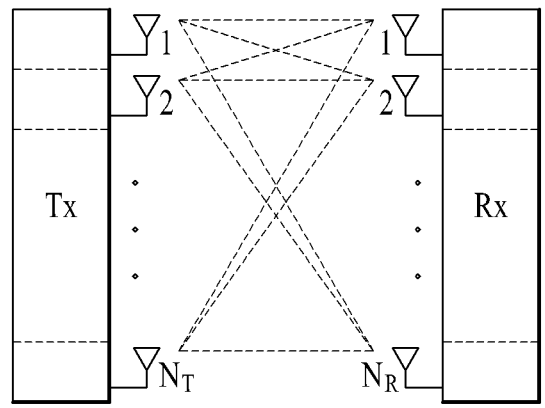
(a)
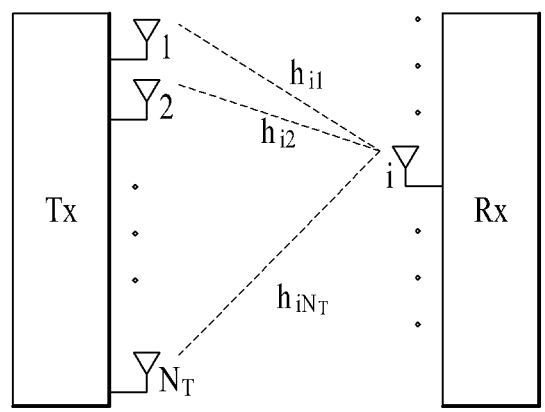
(b)

FIG. 11
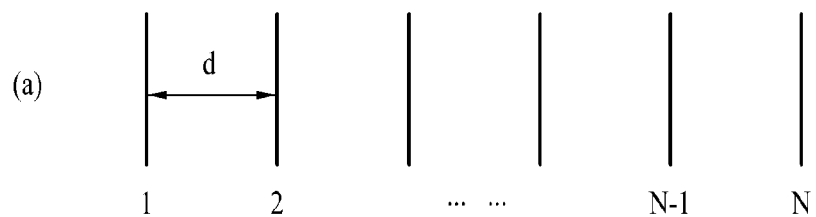
(a)
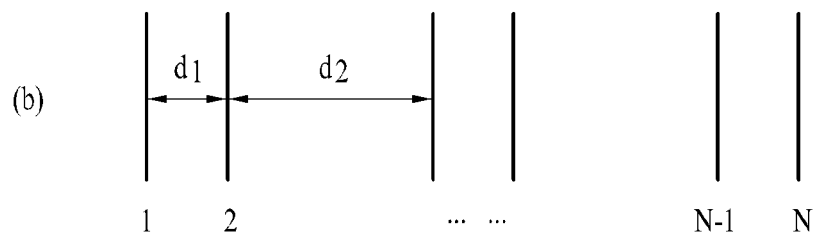
(b)
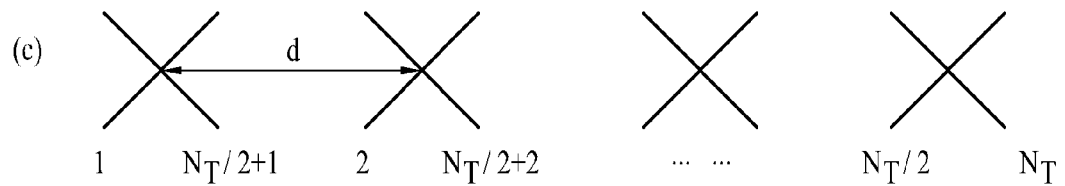
(c)

FIG. 12
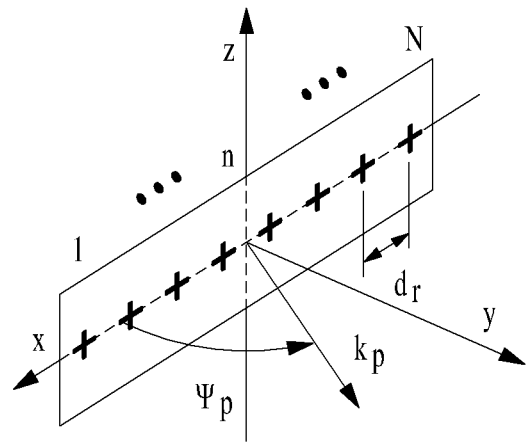
(a)
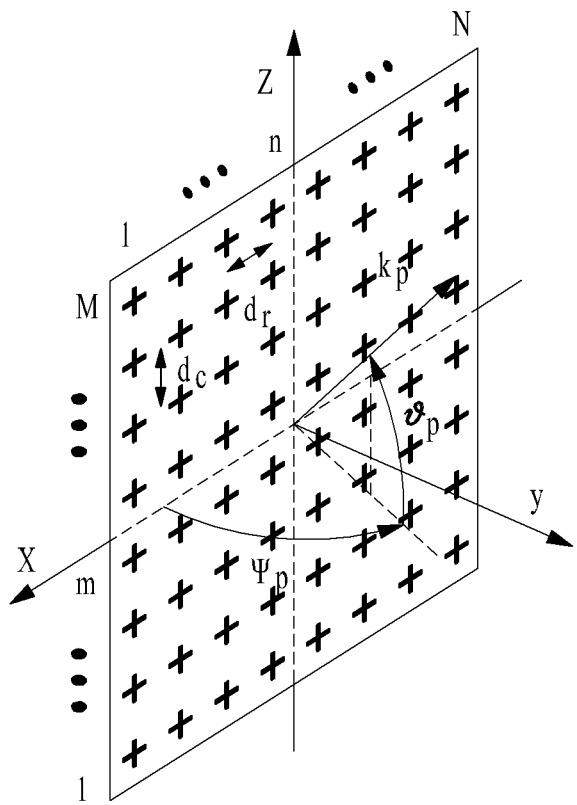
(b)

FIG. 13
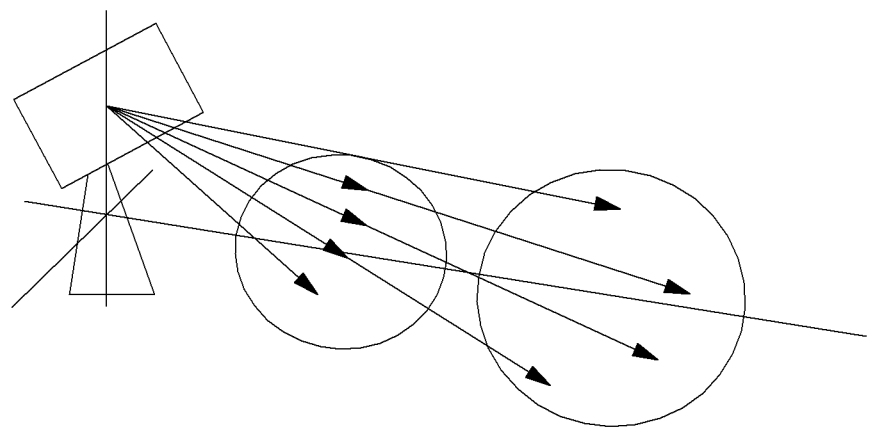
(a)
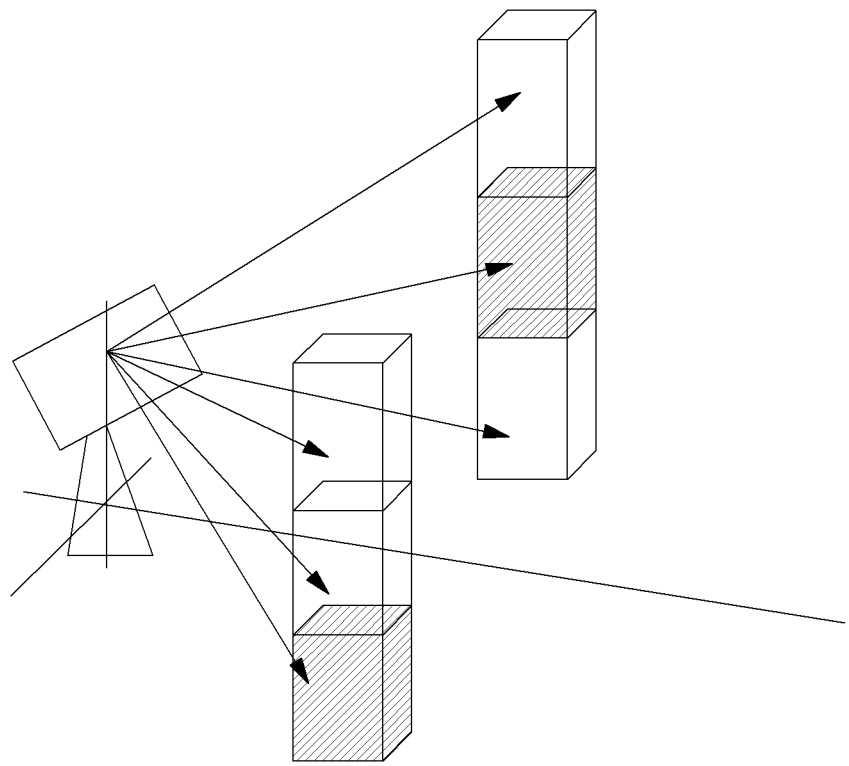
(b)

FIG. 14
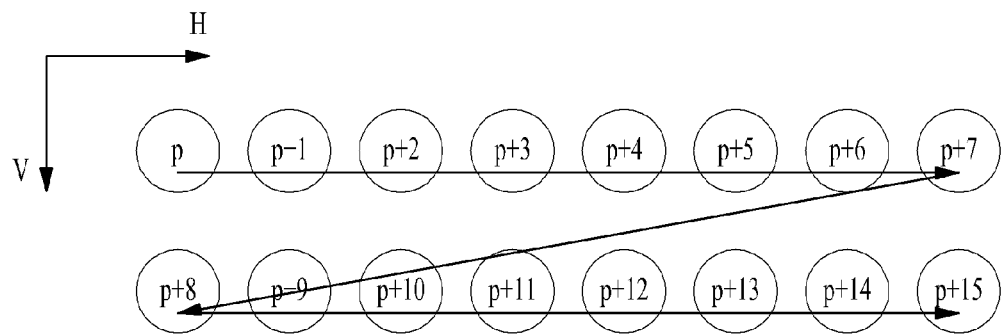
(a)
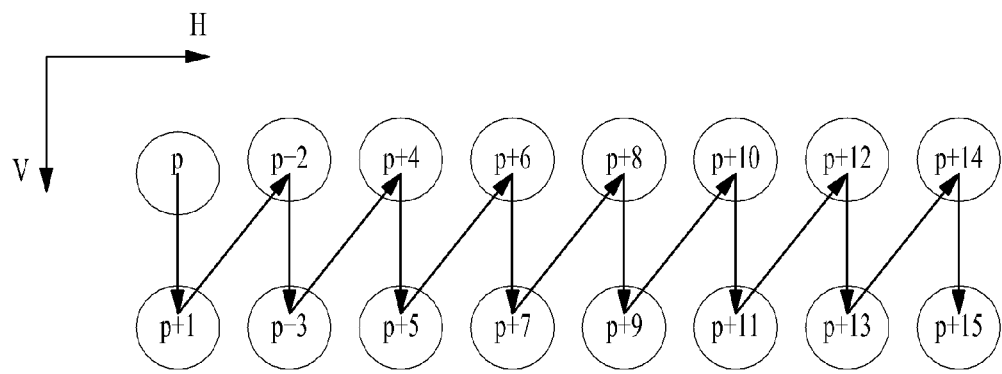
(b)

FIG. 15
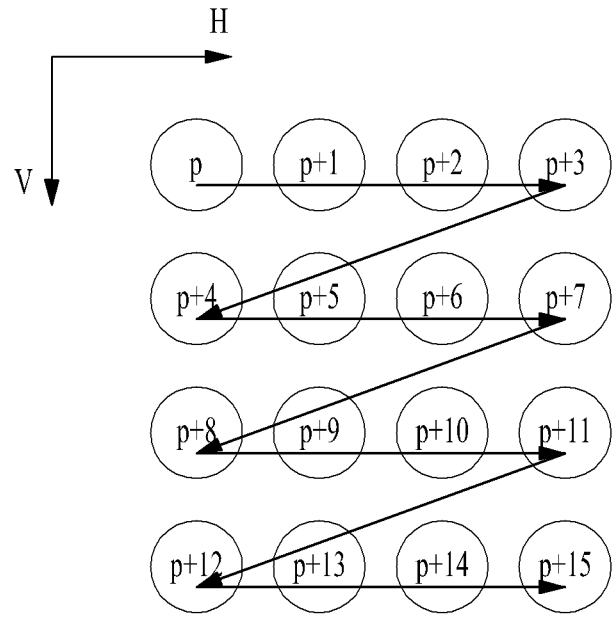
(a)
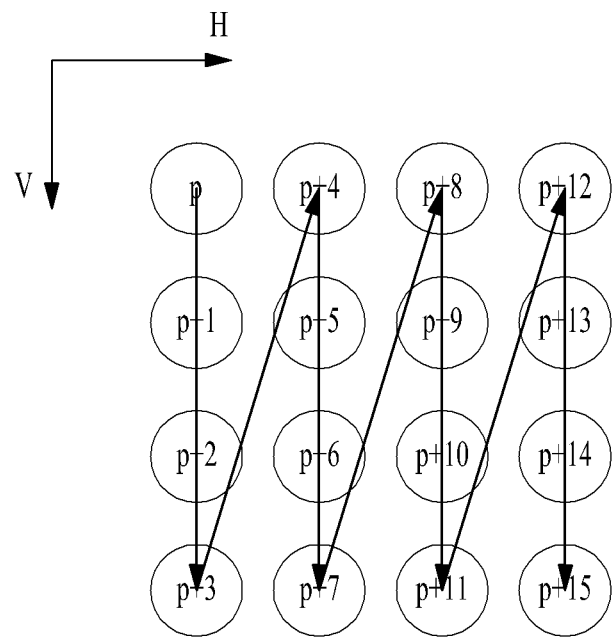
(b)

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/005538, filed on Jun. 24, 2013, which claims the benefit of U.S. Provisional Application No. 61/732,405, filed on Dec. 3, 2012, the contents of which are all hereby incorporated by reference herein in their entirety.

TECHNICAL FIELD

The present invention relates to a wireless communication system, and more particularly, to a method and apparatus for reporting channel status information.

BACKGROUND ART

Multi-Input Multi-Output (MIMO) technology is to improve efficiency in data transmission and reception by using multiple transmitting antennas and multiple receiving antennas instead of a single transmitting antenna and a single receiving antenna. If a single antenna is used, a receiver receives data through a single antenna path. However, if multiple antennas are used, the receiver receives data through various paths. Accordingly, speed and amount in data transmission may be increased, and coverage may be increased.

In order to increase multiplexing gain of MIMO operation, channel status information (CSI) may be fed back from a MIMO receiver to a MIMO transmitter. The receiver may determine CSI by performing channel measurement through a predetermined reference signal (RS) from the transmitter.

DISCLOSURE

Technical Problem

An object of the present invention is to provide a method for configuring reference signal configuration information for supporting a 2-dimensional antenna structure normally efficiently, a method for transmitting a reference signal, and a method for generating and reporting CSI.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for reporting channel state information (CSI) from a user equipment in a wireless communication system, the method comprising: receiving a channel state information-reference signal (CSI-RS) based on CSI-RS configuration information provided by a base station; and reporting to the base station the CSI generated using the CSI-RS, wherein the CSI includes precoding information selected from a predetermined codebook, elements of the predetermined codebook are configured based on a precoding vector W, the precoding vector W is, W1 is a precoding vector applied to a first domain antenna group having a 2D antenna structure, W2 is a precoding vector applied to a second domain antenna group having the 2D antenna structure, and "a" is a value representing phase difference between the first domain antenna group and the second domain antenna group.

In another aspect of the present invention, A user equipment for reporting channel state information (CSI) in a wireless communication system, the user equipment comprising: a receiver; a transmitter; and a processor, wherein the processor is configured to control the receiver to receive a channel state information-reference signal (CSI-RS) based on CSI-RS configuration information that is provided by a base station and control the transmitter to report to the base station the CSI generated using the CSI-RS, the CSI includes precoding information selected from a predetermined codebook, elements of the predetermined codebook are configured based on a precoding vector W, the precoding vector W is, W1 is a precoding vector applied to a first domain antenna group having a 2D antenna structure, W2 is a precoding vector applied to a second domain antenna group having the 2D antenna structure, and "a" is a value representing phase difference between the first domain antenna group and the second domain antenna group.

In another aspect of the present invention, a method for receiving channel state information (CSI) from a base station of a wireless communication system, the method comprising: providing a user equipment with channel state information-reference signal (CSI-RS) configuration information and transmitting a CSI-RS to the user equipment based on the CSI-RS configuration information; and receiving the CSI, which is generated by the user equipment using the CSI-RS, from the user equipment, wherein the CSI includes precoding information selected from a predetermined codebook, elements of the predetermined codebook are configured based on a precoding vector W, the precoding vector W is, W1 is a precoding vector applied to a first domain antenna group having a 2D antenna structure, W2 is a precoding vector applied to a second domain antenna group having the 2D antenna structure, and "a" is a value representing phase difference between the first domain antenna group and the second domain antenna group.

In another aspect of the present invention, a base station for receiving channel state information (CSI) in a wireless communication system, the base station comprising: a receiver; a transmitter; and a processor, wherein the processor is configured to provide a user equipment with channel state information-reference signal (CSI-RS) configuration information and control the transmitter to transmit a CSI-RS to the user equipment based on the CSI-RS configuration information, and control the receiver to receive the CSI, which is generated by the user equipment using the CSI-RS, from the user equipment the CSI includes precoding information selected from a predetermined codebook, elements of the predetermined codebook are configured based on a precoding vector W, the precoding vector W is, W1 is a precoding vector applied to a first domain antenna group having a 2D antenna structure, W2 is a precoding vector applied to a second domain antenna group having the 2D antenna structure, and "a" is a value representing phase difference between the first domain antenna group and the second domain antenna group.

The above aspects of the present invention may include the followings.

In another aspect of the present invention, $$W1 = \frac{1}{\sqrt{N_T}} e^{j2\pi n k/N}, W2 = \frac{1}{\sqrt{N_T}} e^{j2\pi b n k/N},$$

$N_T$ is the number of transmitting antennas, n=0, 1, 2, ..., N−1, k=0, 1, 2, ..., $N_T/2$−1, and N is the number of beams.

In another aspect of the present invention, "b" is determined based on "a".

In another aspect of the present invention, $b = \sqrt{1-a^2}$.

In another aspect of the present invention, the CSI-RS configuration information includes an antenna port count parameter and Ntv number of resource configuration parameters, the antenna port count parameter indicates the number of antennas of the first domain antenna group, and the Ntv corresponds to the number of antennas of the second domain antenna group.

In another aspect of the present invention, the CSI-RS configuration information includes a first antenna port count parameter, a second antenna port count parameter and a resource configuration parameter, the first antenna port count parameter indicates the number of antennas of the first domain antenna group, the second antenna port count parameter indicates the number of antennas of the second domain antenna group, and the resource configuration parameter indicates a resource element location of the CSI-RS for the first domain antenna group corresponding to one antenna of the second domain antenna group.

In another aspect of the present invention, a resource element location of the CSI-RS for the first domain antenna group corresponding to each of the other antennas of the second domain antenna group is determined based on an offset value corresponding to a value of the second antenna port count parameter.

In another aspect of the present invention, the 2D antenna structure is configured by the number of antennas of the second domain antenna group×the number of antennas of the first domain antenna group.

In another aspect of the present invention, the first domain is a horizontal domain, and the second domain is a vertical domain.

The aforementioned embodiments and the following detailed description of the present invention are only exemplary, and are intended for additional description of the present invention cited in claims.

Advantageous Effects

According to the present invention, a method for configuring new reference signal configuration information, a method for transmitting a reference signal, and a method for generating and reporting CSI may be provided, whereby a 2-dimensional antenna structure may be supported normally and efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating a wireless communication system having multiple antennas;

FIG. 11 is a diagram illustrating examples constituting 8 transmitting antennas;

FIG. 12 is a diagram illustrating ULA and URA;

FIG. 13 is a diagram illustrating examples of beamforming based on 2-dimensional antenna configuration;

FIGS. 14 and 15 are diagrams illustrating a method for allocating antenna port numbers in a 2-dimensional antenna structure;

BEST MODE FOR CARRYING OUT THE INVENTION

Figure 1:
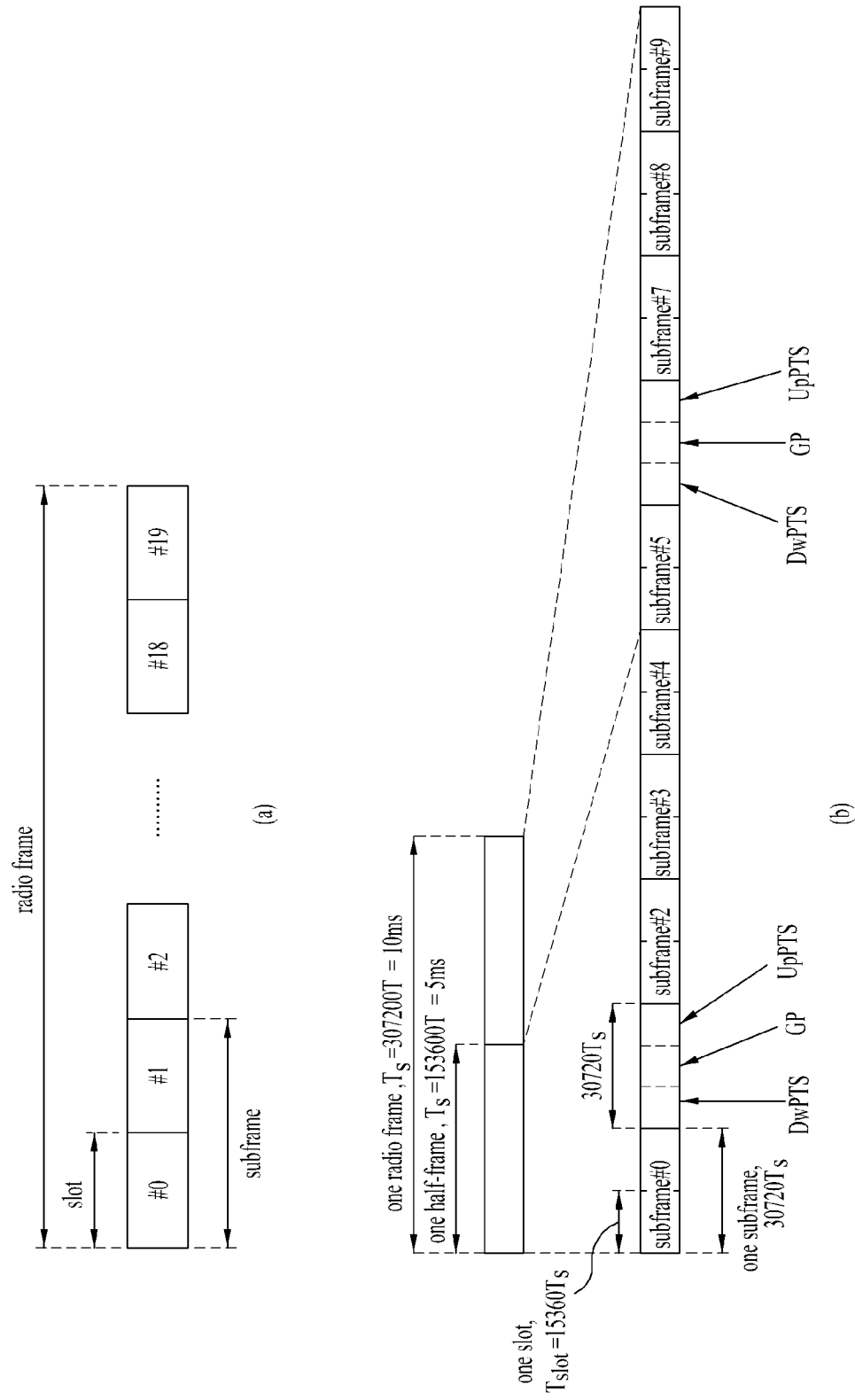
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
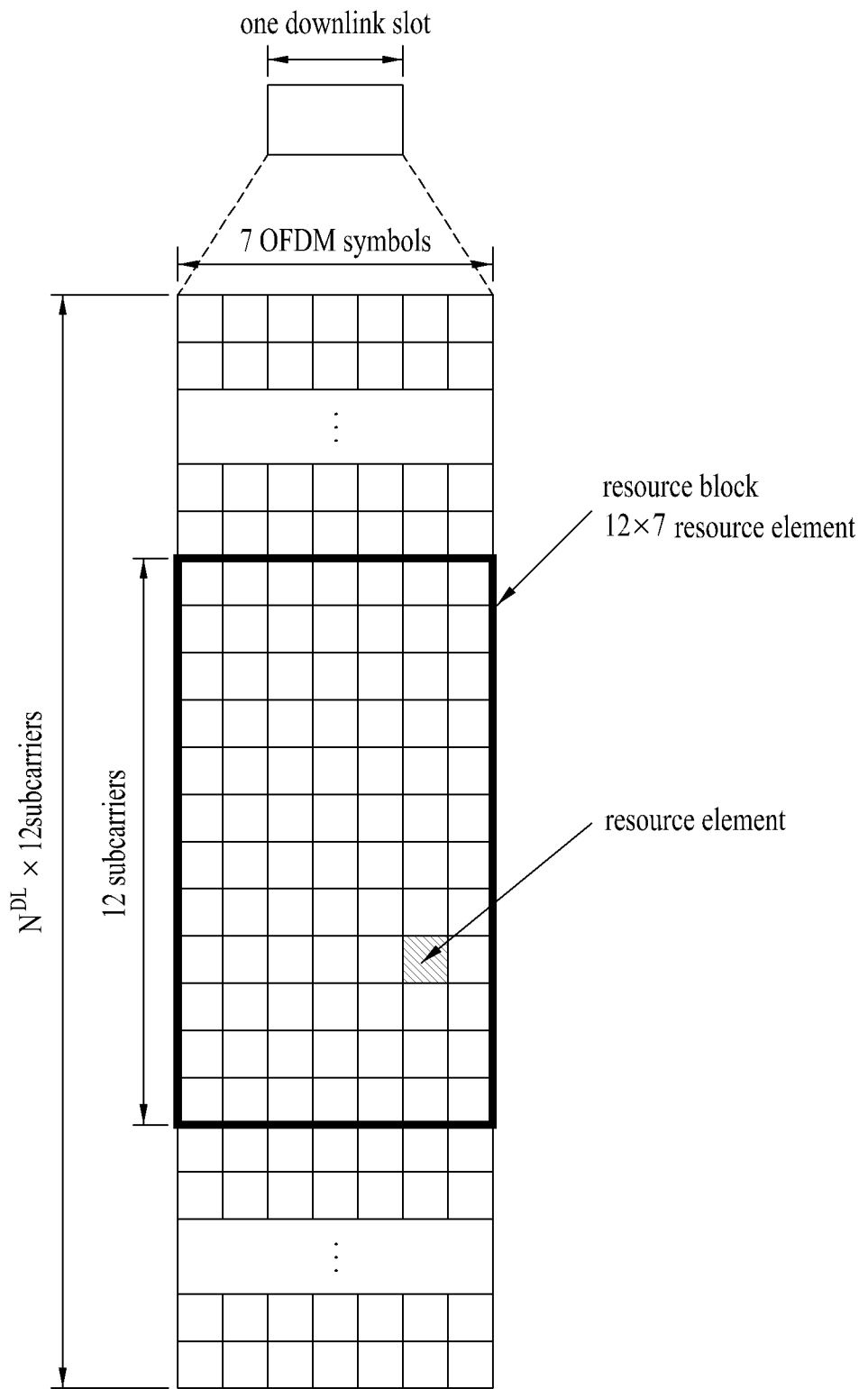
FIG. 2 is a diagram illustrating a resource grid at a downlink slot.

FIG. 2 is a diagram illustrating a resource grid at a downlink slot.

One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N^{DL}$ of resource blocks (RBs) included in the downlink slot depends on a downlink transmission bandwidth. A structure of an uplink slot may be the same as that of the downlink slot.

Figure 3:
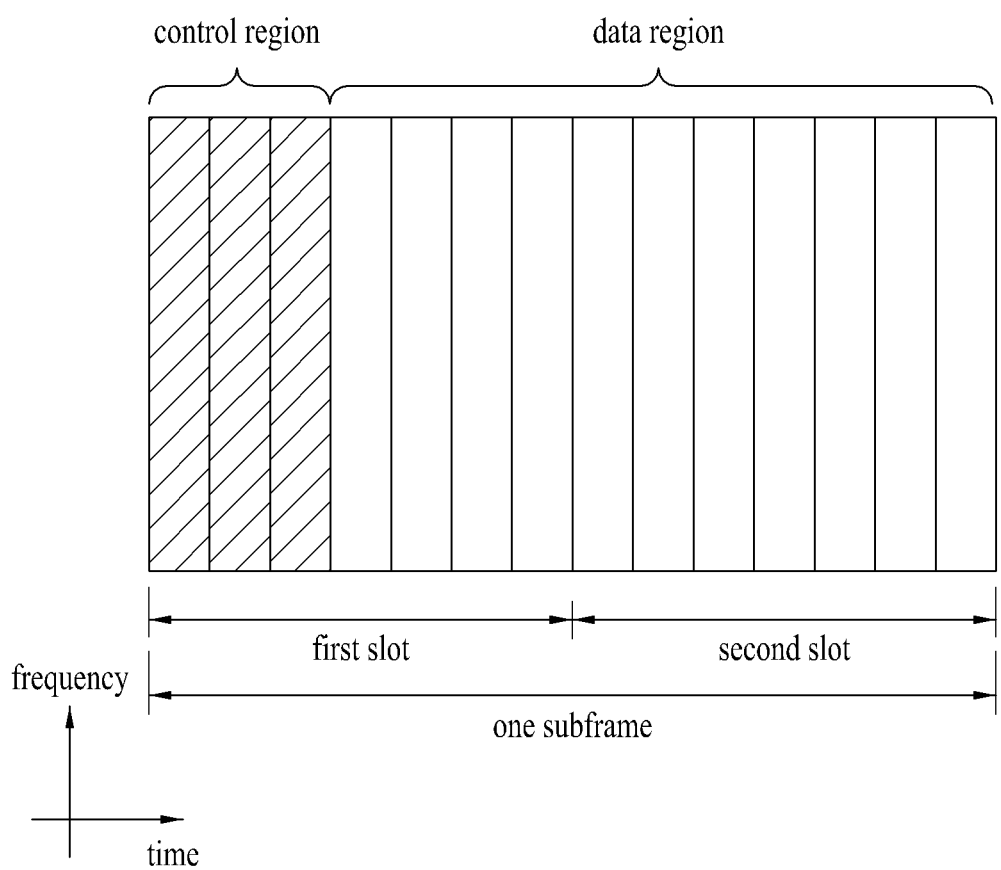
FIG. 3 is a diagram illustrating a structure of a downlink subframe.

FIG. 3 is a diagram illustrating a structure of a downlink subframe.

Maximum three OFDM symbols located at the front of the first slot within one subframe correspond to a control region to which a control channel is allocated. The other OFDM symbols correspond to a data region to which a physical downlink shared channel (PDSCH) is allocated.

Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control commands of an individual user equipment within a random user equipment group, transmission power control information, and activation of voice over Internet protocol (VoIP). A plurality of PDCCHs may be transmitted within the control region, and the user equipment may monitor the plurality of PDCCHs.

The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE.

The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
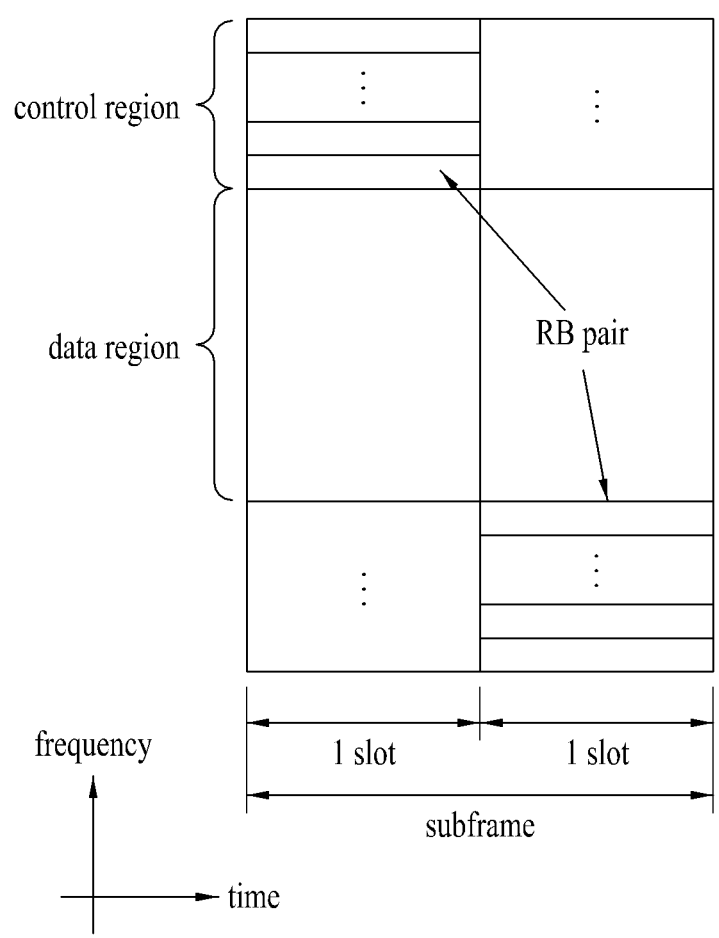
FIG. 4 is a diagram illustrating a structure of an uplink subframe.

FIG. 4 is a diagram illustrating a structure of an uplink subframe.

The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Modeling of MIMO System

FIG. 5 is a schematic view illustrating a wireless communication system having multiple antennas.

As shown in FIG. 5(a), if the number of transmitting antennas is increased to $N_T$ and the number of receiving antennas is increased to $N_R$, channel transmission capacity is increased theoretically in proportion to the number of antennas unlike that a plurality of antennas are used in only a transmitter or a receiver. Accordingly, it is possible to improve a transmission rate and remarkably improve frequency efficiency. As channel transmission capacity is increased, a transmission rate may be increased theoretically as much as a value obtained by multiplying a maximum transmission rate $R_0$, which corresponds to a case where a single antenna is used, by an increase rate $R_i$.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Also, some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, ŝ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

It is considered that a weight matrix W is applied to the information vector Ŝ of which transmission power is controlled, so as to obtain $N_T$ transmitting signals $x_1, x_2, \ldots, x_{N_T}$. In this case, the weight matrix W serves to properly distribute the transmission information to each antenna. Such transmitting signals $x_1, x_2, \ldots, x_{N_T}$ may be expressed as follows using a vector X.

$$X = \begin{bmatrix} x_1 \\ x_2 \\ \vdots \\ x_i \\ \vdots \\ x_{N_T} \end{bmatrix} = \qquad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, $W_{ij}$ means a weight value between the $i_{th}$ transmitting antenna and the jth information. W may be referred to as a precoding matrix.

If there exist $N_R$ receiving antennas, receiving signals $y_1, y_2, \ldots, y_{N_R}$ of the respective antennas may be expressed by a vector as follows.

$$y = [y_1, y_2, \ldots, y_{N_R}]^T \qquad \text{[Equation 6]}$$

In case of channel modeling in the MIMO communication system, channels may be classified depending on indexes of transmitting and receiving antenna indexes. In this case, a channel that passes from the jth transmitting antenna to the ith receiving antenna will be expressed as $h_{ij}$. It is noted that index of the receiving antenna is prior to index of the transmitting antenna in index of $h_{ij}$.

Meanwhile, FIG. 5(b) illustrates channels from $N_T$ transmitting antennas from the receiving antenna i. Several channels may be grouped into one and then may be expressed by a vector type or a matrix type. As shown in FIG. 5(b), the channels from $N_T$ transmitting antennas to the ith receiving antenna may be expressed as follows.

$$h_i^T = [h_{i1}, h_{i2}, \ldots, h_{iN_T}] \qquad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Since additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n = [n_1, n_2, \ldots, n_{N_R}]^T \qquad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the number of rows and columns of the channel matrix H indicating the channel state is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \qquad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that may transmit different kinds of information from a given channel.

In this specification, 'Rank' for MIMO transmission represents the number of paths that may transmit a signal independently at a specific time and a specific frequency resource, and 'the number of layers' represents the number of signal streams transmitted through each path. Generally, since the transmitter transmits layers corresponding to the number of ranks used for signal transmission, the ranks are the same as the number of layers unless mentioned otherwise.

Reference Signal (RS)

When a packet is transmitted in the wireless communication system, signal distortion may occur during transmission of the packet because the packet is transmitted through a radio channel. In order to normally receive the distorted signal, a receiver should correct distortion of the received signal by using channel information. In order to discover the channel information, it is required to transmit the signal known by both a transmitter and the receiver and discover the channel information using a distortion level of the signal when the signal is transmitted through the channel. In this case, the signal known by both the transmitter and the receiver will be referred to as a pilot signal or a reference signal.

In case that the transmitter or the receiver of the wireless communication system transmits and receives data by using multiple antennas, a channel status between each transmitter and each receiver should be known to receive a normal signal. Accordingly, a separate reference signal should be provided per transmitting antenna.

In the wireless communication system, the reference signal (RS) may be divided into two types in accordance with its purpose. Examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received and measured even by a user equipment that does not receive downlink data for a specific subframe. This reference signal for acquisition of channel information may be used even for measurement of handover. The latter reference signal is transmitted from the base station together with a corresponding resource when the base station transmits downlink data. In this case, the user equipment may perform channel estimation by receiving the corresponding reference signal, whereby the user equipment may demodulate the data. This reference signal for data demodulation should be transmitted to a region to which data are transmitted.

The existing 3GPP LTE system (for example, 3GPP LTE release-8) defines two types of downlink RSs for unicast service. The one of the downlink reference signals is a common reference signal (CRS), and the other one is a dedicated reference signal (DRS). The CRS is used for both information acquisition of channel status and measurement for handover, and may be referred to as a cell-specific RS. The DRS is used for data demodulation, and may be referred to as a UE-specific RS. In the existing 3GPP LTE system, the DRS may be used for data demodulation only, and the CRS may be used for both acquisition of channel information and data demodulation.

The CRS is a cell-specific RS and is transmitted to a wideband per subframe. The CRS for maximum four antenna ports may be transmitted in accordance with the number of transmitting antennas of the base station. For example, if the number of transmitting antennas of the base station is 2, CRS for antenna ports 0 and 1 may be transmitted. If the number of transmitting antennas of the base station is 4, CRS for antenna ports 0 to 3 may be transmitted respectively.

Figure 6:
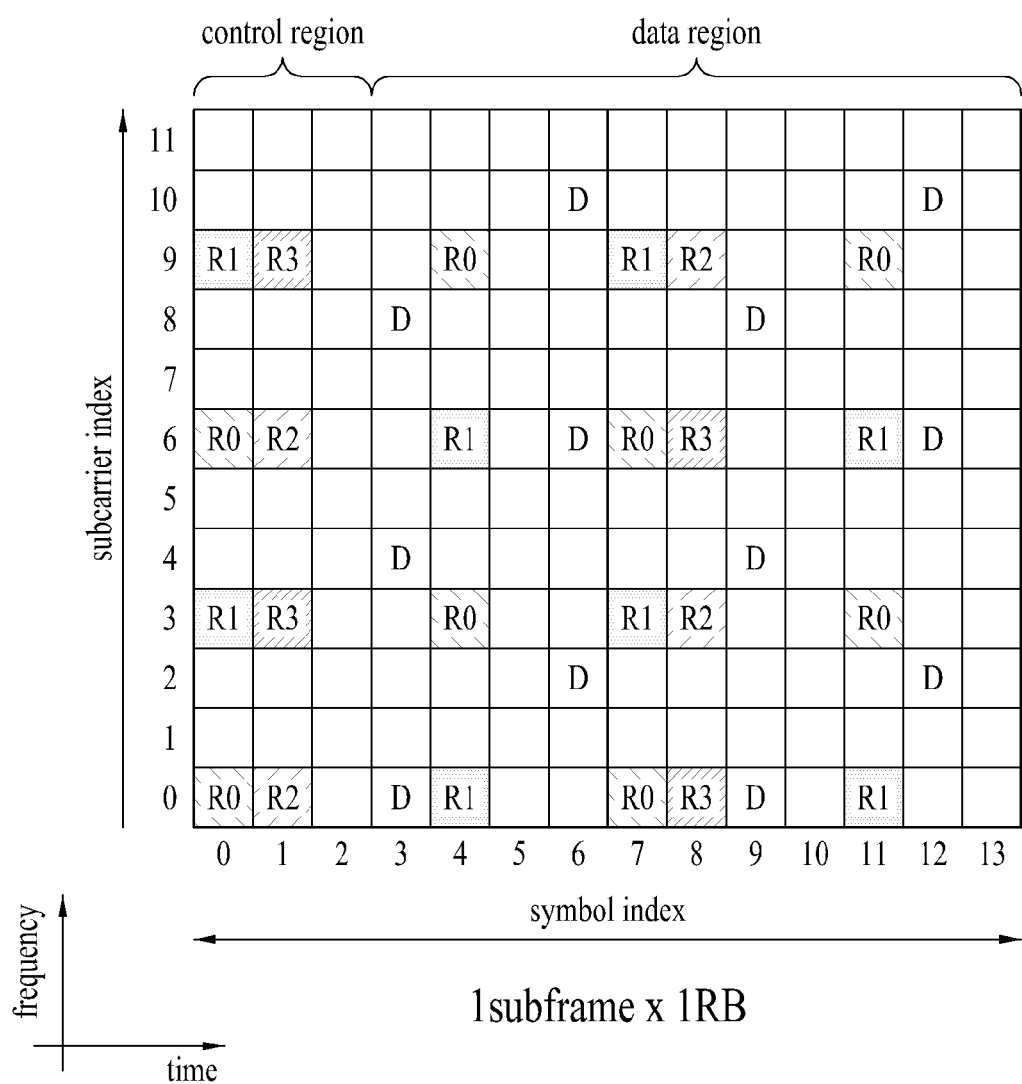
FIG. 6 is a diagram illustrating an exemplary pattern of CRS and DRS on one resource block pair.

FIG. 6 is a diagram illustrating an exemplary pattern of CRS and DRS on one resource block pair.

In the example of the reference signal pattern in FIG. 6, patterns of CRS and DRS are provided on one resource block pair (in case of normal CP, 14 OFDM symbols on the time×12-subcarriers on the frequency) in the system that the base station supports four transmitting antennas. In FIG. 6, resource elements remarked with 'R0', 'R1', 'R2' and 'R3' represent positions of the CRS for antenna port indexes 0, 1, 2 and 3. Meanwhile, in FIG. 6, a resource element marked with 'D' represents the position of the DRS defined in the LTE system.

The LTE-A system which is an evolved version of the LTE system may support maximum eight transmitting antennas on the downlink. Accordingly, reference signals for maximum eight transmitting antennas should also be supported. In the LTE system, since downlink reference signals are defined for maximum four antenna ports only, if the base station includes minimum four downlink transmitting antennas to maximum eight downlink transmitting antennas in the LTE-A system, reference signals for these antenna ports should additionally be defined. The reference signals for maximum eight transmitting antenna ports may be considered for two types of reference signals, i.e., the reference signal for channel measurement and the reference signal for data demodulation as described above.

One of important considerations in designing the LTE-A system is backward compatibility. Backward compatibility means that the LTE user equipment of the related art should be operated normally even in the LTE-A system. In view of reference signal transmission, if reference signals for maximum eight transmitting antenna ports should be defined additionally in the time-frequency domain to which CRS defined in the LTE standard is transmitted to a full band every subframe, RS overhead becomes too great. Accordingly, it should be considered that RS overhead is reduced in newly designing RS for maximum eight antenna ports.

The reference signal newly introduced in the LTE-A system may be divided into two types. One of the reference signals is a channel status information-reference signal (CSI-RS) which is the RS for channel measurement for selecting transmission rank, modulation and coding scheme (MCS), and precoding matrix index (PMI), and the other one is a demodulation RS (DMRS) which is the RS for demodulation of data transmitted through maximum eight transmitting antennas.

The CSI-RS for channel measurement is designed for channel measurement mainly unlike the existing CRS used for channel measurement, handover measurement, and data demodulation. The CSI-RS may also be used for handover measurement. Since the CSI-RS is transmitted only to obtain channel status information, it may not be transmitted per subframe unlike the CRS of the existing LTE system. Accordingly, in order to reduce overhead of the CSI-RS, the CSI-RS may be designed to be intermittently (for example, periodically) be transmitted on the time axis.

If data are transmitted on a random downlink subframe, a dedicated DMRS is transmitted to the user equipment for which data transmission is scheduled. In other words, the DMRS may be referred to as a UE-specific RS. The DMRS dedicated for a specific user equipment may be designed to be transmitted from only the resource region for which the corresponding user equipment is scheduled, that is, the time-frequency domain to which data for the corresponding user equipment are transmitted.

Figure 7:
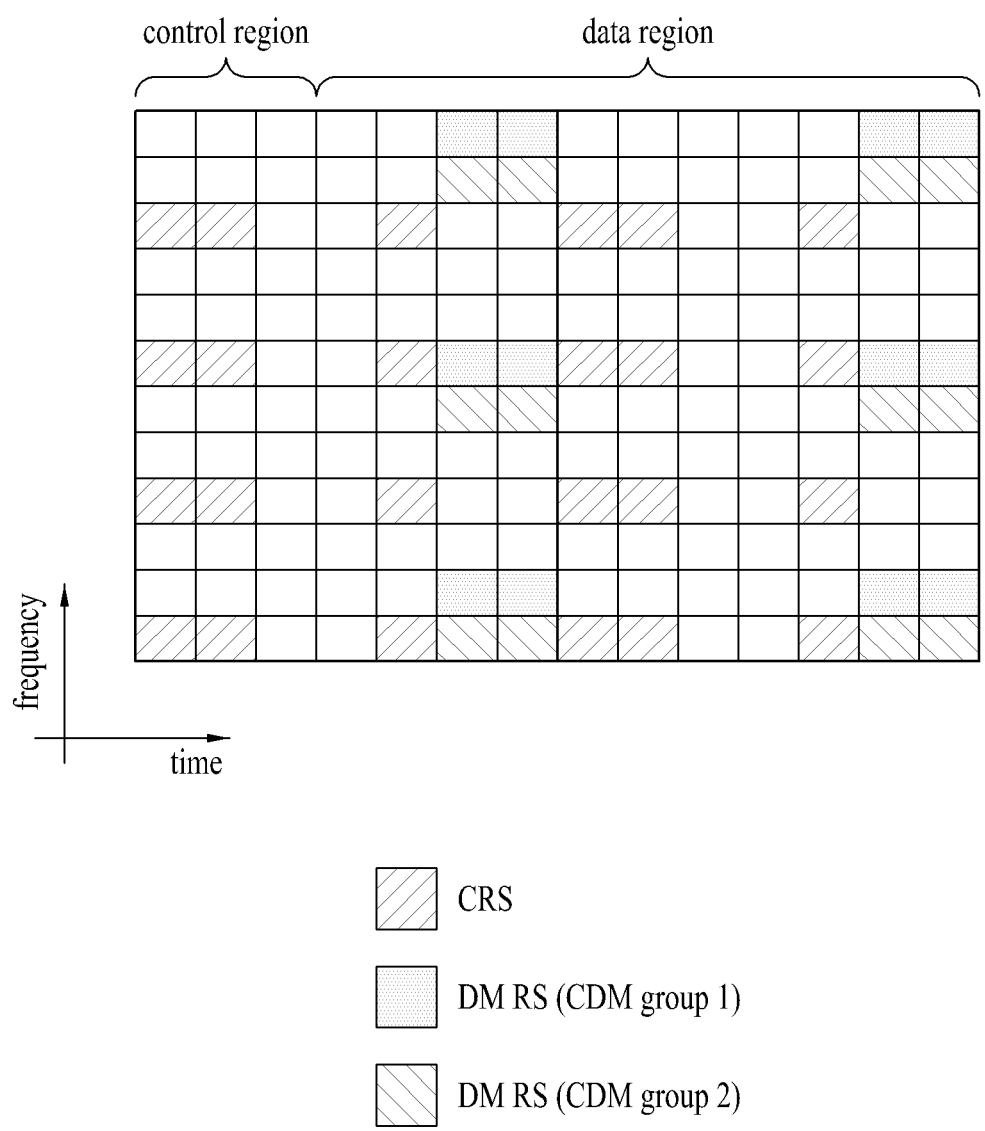
FIG. 7 is a diagram illustrating an example of a DMRS pattern defined in an LTE-A system.

FIG. 7 is a diagram illustrating an example of DMRS pattern defined in the LTE-A system.

FIG. 7 illustrates a position of a resource element where DMRSs are transmitted on one resource block pair (in case of normal CP, 14 OFDM symbols on the time×12 subcarriers on the frequency) to which downlink data are transmitted. The DMRS may be transmitted four antenna ports (antenna port indexes 7, 8, 9 and 10) defined additionally in the LTE-A system. The DMRSs for different kinds of antenna ports may be identified from one another in such a manner that they are located on different frequency resources (subcarriers) and/or different time resources (OFDM symbols) (that is, the DMRSs may be multiplexed in accordance with FDM and/or TDM mode). Also, the DMRSs for different antenna ports located on the same time-frequency resource may be identified from one another by orthogonal codes (that is, the DMRSs may be multiplexed in accordance with CDM mode). In the example of FIG. 7, the DMRSs for the antenna ports 7 and 8 may be located on the resource elements (REs) of DMRS CDM group 1, and may be multiplexed by orthogonal codes. Likewise, in the example of FIG. 7, the DMRSs for the antenna ports 9 and 10 may be located on the resource elements (REs) of DMRS CDM group 2, and may be multiplexed by orthogonal codes.

When the base station transmits the DMRS, the same precoding as that applied to data is applied to the DMRS. Accordingly, channel information estimated by the user equipment using the DMRS (or UE-specific RS) is the precoded channel information. The user equipment may easily perform data demodulation by using the precoded channel information estimated through the DMRS. However, since the user equipment cannot know the precoding information applied to the DMRS, the user equipment cannot acquire channel information, which is not precoded, from the DMRS. The user equipment may acquire channel information, which is not precoded, by using a separate reference signal in addition to the DMRS, that is, the aforementioned CSI-RS.

Figure 8:
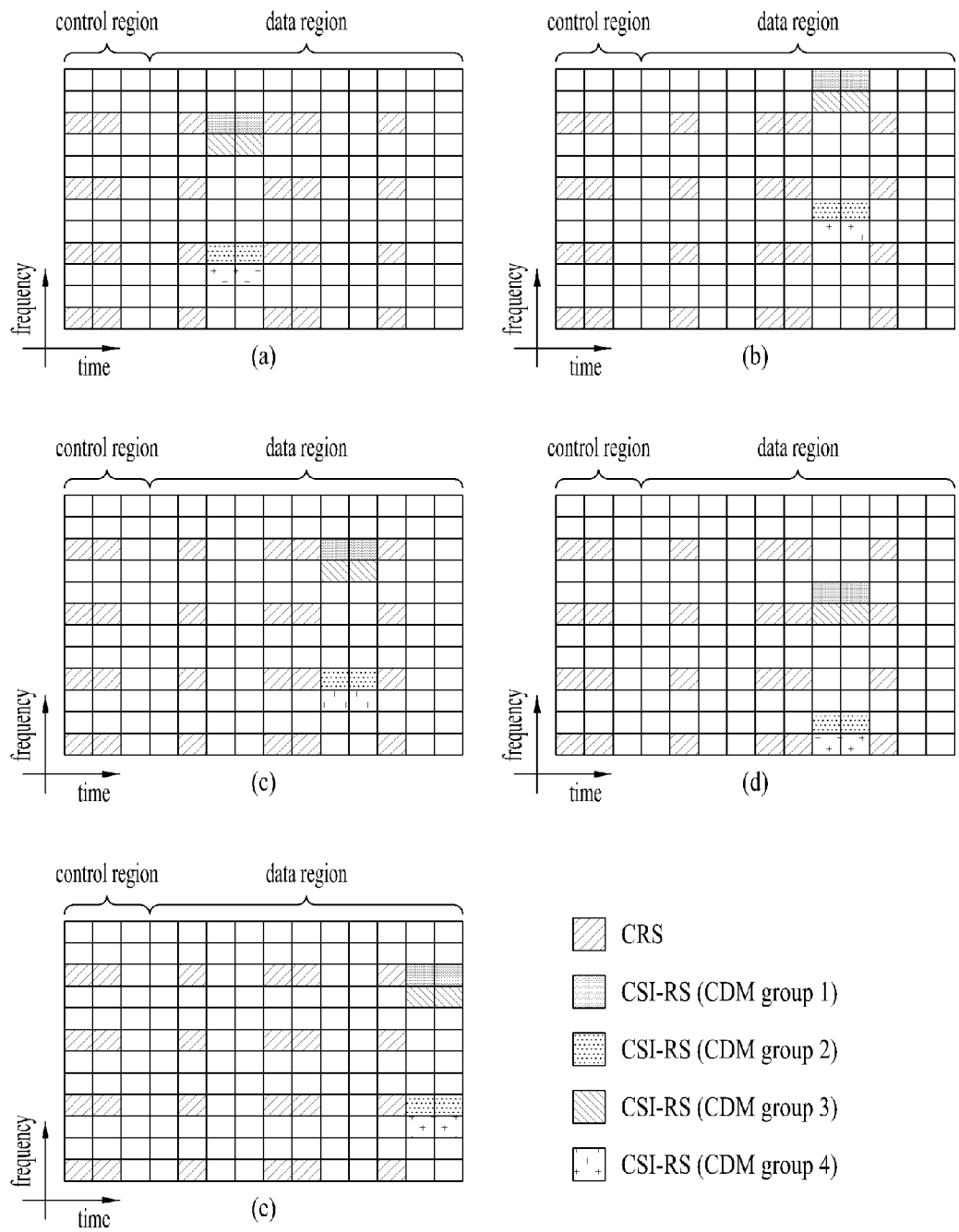
FIG. 8 is a diagram illustrating examples of a CSI-RS pattern defined in an LTE-A system.

FIG. 8 is a diagram illustrating examples of CSI-RS patterns defined in the LTE-A system.

FIG. 8 illustrates a position of a resource element where CSI-RSs are transmitted on one resource block pair (in case of normal CP, 14 OFDM symbols on the time×12 subcarriers on the frequency) to which downlink data are transmitted. One of CSI-RS patterns in FIG. 8(a) to FIG. 8(e) may be used for a random downlink subframe. The CSI-RS may be transmitted for eight antenna ports (antenna port indexes 15, 16, 17, 18, 19, 20, 21 and 22) defined additionally in the LTE-A system. The CSI-RSs for different antenna ports may be identified from one another in such a manner that they are located on different frequency resources (subcarriers) and/or different time resources (OFDM symbols) (that is, the CSI-RSs may be multiplexed in accordance with FDM and/or TDM mode). Also, the CSI-RSs for different antenna ports located on the same time-frequency resource may be identified from one another by orthogonal codes (that is, the CSI-RSs may be multiplexed in accordance with CDM mode). In the example of FIG. 8(a), the CSI-RSs for the antenna ports 15 and 16 may be located on the resource elements (REs) of CSI-RS CDM group 1, and may be multiplexed by orthogonal codes. In the example of FIG. 8(a), the CSI-RSs for the antenna ports 17 and 18 may be located on the resource elements (REs) of CSI-RS CDM group 2, and may be multiplexed by orthogonal codes. In the example of FIG. 8(a), the CSI-RSs for the antenna ports 19 and 20 may be located on the resource elements (REs) of CSI-RS CDM group 3, and may be multiplexed by orthogonal codes. In the example of FIG. 8(a), the CSI-RSs for the antenna ports 21 and 22 may be located on the resource elements (REs) of CSI-RS CDM group 4, and may be multiplexed by orthogonal codes. The same principle described based on FIG. 8(a) may be applied to FIG. 8(b) to FIG. 8(e).

The RS patterns of FIGS. 6 and 8 are only exemplary, and various embodiments of the present invention are not limited to a specific RS pattern. In other words, various embodiments of the present invention may equally be applied to even a case where RS pattern different from those of FIGS. 6 and 8 is defined and used.

CSI-RS Configuration

As described above, in the LTE-A system that supports maximum eight transmitting antennas on the downlink, the base station should transmit CSI-RSs for all antenna ports. Since transmission of the CSI-RSs for maximum eight transmitting antenna ports every subframe has a drawback in that overhead is too great, the CSI-RSs should be transmitted intermittently on the time axis without being transmitted every subframe, to reduce overhead. Accordingly, the CSI-RSs may be transmitted periodically at a period of integer multiple of one subframe or may be transmitted at a specific transmission pattern.

At this time, the transmission period or transmission pattern of the CSI-RS may be configured by the network (for example, base station). In order to perform measurement based on the CSI-RS, the user equipment should know CSI-RS configuration for each antenna port of a cell (or transmission point (TP) to which the user equipment belongs. CSI-RS configuration may include downlink subframe index for which the CSI-RS is transmitted, time-frequency positions (for example, CSI-RS patterns the same as those of FIG. 8(a) to FIG. 8(e)) of CSI-RS resource elements (REs) within a transmission subframe, and CSI-RS sequence (used for CSI-RS and generated pseudo-randomly in accordance with a predetermined rule on the basis of slot number, cell ID, CP length, etc.). In other words, a plurality of CSI-RS configurations may be used by a given base station, and the base station indicate CSI-RS configuration, which will be used for user equipment(s) within a cell, among the plurality of CSI-RS configurations.

The plurality of CSI-RS configurations may include or not include one CSI-RS configuration assumed by the user equipment that transmission power of the CSI-RS is not 0 (non-zero). Also, the plurality of CSI-RS configurations may include or not include one or more CSI-RS configurations assumed by the user equipment that transmission power of the CSI-RS is 0.

Also, each bit of parameters (for example, 16-bit bitmap ZeroPowerCSI-RS parameter) for CSI-RS configuration of the transmission power of 0 may correspond to CSI-RS configuration (or REs to which the CSI-RS may be allocated in accordance with CSI-RS configuration) in accordance with an upper layer, and the user equipment may assume that the transmission power at the CSI-RS REs of CSI-RS configuration corresponding to a bit set to 1 in the corresponding parameter is 0.

Also, since the CSI-RSs for the respective antenna ports are required to be identified from one another, resources to which the CSI-RSs for the respective antenna ports are transmitted should be orthogonal to one another. As described with reference to FIG. 8, the CSI-RSs for the respective antenna ports may be multiplexed in accordance with FDM, TDM and/or CDM mode by using orthogonal frequency resources, orthogonal time resources and/or orthogonal code resources.

When the base station notifies the user equipment within the cell of CSI-RS information (CSI-RS configuration), the base station should first notify the user equipment of time-frequency information into which the CSI-RSs for the respective antenna ports are mapped. In more detail, the time information may include subframe numbers to which the CSI-RSs are transmitted, a transmission period of CSI-RSs, offset of subframe to which the CSI-RSs are transmitted, and OFDM symbol number to which CSI-RS resource element (RE) of a specific antenna is transmitted. The frequency information may include frequency spacing to which CSI-RS resource element (RE) of a specific antenna is transmitted, offset or shift value of RE on a frequency axis, etc.

Figure 9:
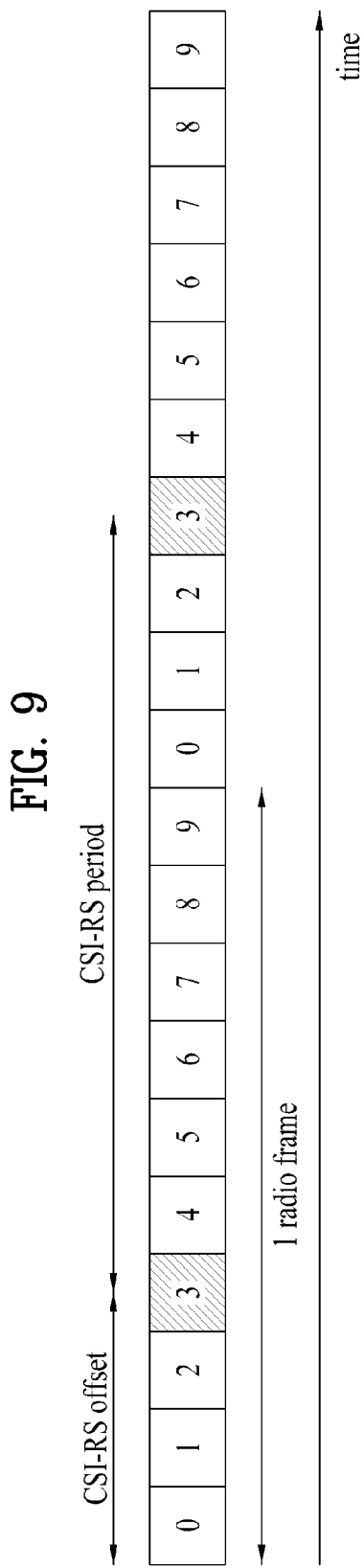
FIG. 9 is a diagram illustrating an example of a method for periodically transmitting CSI-RS.

FIG. 9 is a diagram illustrating an example of a method for periodically transmitting CSI-RS.

The CSI-RS may be transmitted at a period of integer multiple (for example, 5-subframe period, 10-subframe period, 20-subframe period, 40-subframe period, or 80-subframe period) of one subframe.

In FIG. 9, one radio frame includes 10 subframes (subframe numbers 0 to 9). For example, in FIG. 9, a transmission period of the CSI-RS of the base station is 10 ms (that is, 10 subframes), and CSI-RS transmission offset is 3. The offset value may be varied depending on respective base stations such that the CSI-RSs of several cells may uniformly be distributed on the time. If the CSI-RS is transmitted at a period of 10 ms, the offset value may have one of 0 to 9. Similarly, if the CSI-RS is transmitted at a period of 5 ms, the offset value may have one of 0 to 4, if the CSI-RS is transmitted at a period of 20 ms, the offset value may have one of 0 to 19, if the CSI-RS is transmitted at a period of 40 ms, the offset value may have one of 0 to 39, and if the CSI-RS is transmitted at a period of 80 ms, the offset value may have one of 0 to 79. This offset value represents a value of subframe at which the base station starts CSI-RS transmission at a predetermined period. If the base station notifies the user equipment of the transmission period and offset value of the CSI-RS, the user equipment may receive the CSI-RS of the base station at the corresponding subframe position by using the corresponding value. The user equipment may measure a channel through the received CSI-RS and, as a result, report information such as CQI, PMI and/or RI (Rank Indicator) to the base station. In this specification, CQI, PMI, and RI may be referred to as CQI (or CSI) except that they are described separately. Also, the information related to the CSI-RS may commonly be applied to the user equipments within the cell as cell-specific information. Also, the CSI-RS transmission period and offset may be designated separately for each CSI-RS configuration. For example, separate CSI-RS transmission period and offset may be set to the CSI-RS configuration indicating CSI-RS transmitted at a transmission power of 0 as described later and CSI-RS configuration indicating CSI-RS transmitted at a transmission power of non-zero.

Unlike the CRS transmitted at all the subframes at which the PDSCH may be transmitted, the CSI-RS may be set such that the CSI-RS is transmitted at some subframes only. For example, CSI subframe sets $C_{CSI,0}$ and $C_{CSI,1}$ may be configured by the upper layer. CSI reference resource (that is, predetermined resource region which becomes a reference of CSI calculation) may belong to either $C_{CSI,0}$ or $C_{CSI,1}$, or may not belong to both $C_{CSI,0}$ and $C_{CSI,1}$. Accordingly, if the CSI subframe sets $C_{CSI,0}$ and $C_{CSI,1}$ are configured by the upper layer, the user equipment may not expect that CSI reference resource existing at a subframe that does not belong to any one of the CSI subframe sets will be triggered (or indication of CSI calculation).

Also, the CSI reference resource may be set on a valid downlink subframe. The valid downlink subframe may be set as a subframe that satisfies various requirements. One of the requirements may be the subframe that belongs to the CSI subframe set linked to periodic CSI report if the CSI subframe set is configured for the user equipment in case of periodic CSI report.

Also, the user equipment may obtain CQI indexes from the CSI reference resource by considering the following assumptions (for details, see 3GPP TS 36.213).

First three OFDM symbols of one subframe are reserved by control signaling.

There is no resource element used by a primary synchronization signal, a secondary synchronization signal, or physical broadcast signal (PBCH).

CP length of non-MBSFN subframe

Redundancy version is 0

If the CSI-RS is used for channel measurement, a PDSCH EPRE (Energy Per Resource Element) to CSI-RS EPRE ratio depends on a predetermined rule.

In case of CSI report in a transmission mode 9 (that is, mode that supports maximum eight-layer transmission), if PMI/RI report is configured for the user equipment, it is assumed that DMRS overhead is matched with rank which is reported most recently (for example, since DMRS overhead on one resource block pair is 12 REs in case of two or more antenna ports (that is, less than rank 2) as described with reference to FIG. 7 but is 24 REs in case of three or more antenna ports (that is, more than rank 3), CQI index may be calculated by assuming DMRS overhead corresponding to the rank value which is reported most recently).

RE is not allocated to CSI-RS and 0-power CSI-RS.

RE is not allocated to positioning RS (PRS).

PDSCH transmission scheme depends on a transmission mode (which may be default mode) currently set for the user equipment.

A PDSCH EPRE to cell-specific reference signal EPRE ratio depends on a predetermined rule.

This CSI-RS configuration may be notified from the base station to the user equipment by using RRC (Radio Resource Control) signaling, for example. In other words, information on the CSI-RS configuration may be provided to each user equipment within the cell by using dedicated RRC signaling. For example, the base station may notify the user equipment of CSI-RS configuration through RRC signaling when the user equipment establishes connection with the base station through initial access or handover. Alternatively, when the base station transmits RRC signaling message, which requires channel status feedback based on CSI-RS measurement, to the user equipment, the base station may notify the user equipment of the CSI-RS configuration through corresponding RRC signaling message.

In the meantime, the time position where the CSI-RS exists, that is, cell-specific subframe setup period and cell-specific subframe offset may be listed as illustrated in Table 1 below.

TABLE 1

| CSI-RS subframe configuration $I_{CSI-RS}$ | CSI-RS period $T_{CSI-RS}$ (subframe) | CSI-RS subframe offset $\Delta_{CSI-RS}$ (subframe) |
| --- | --- | --- |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

As described above, the parameter $I_{CSI-RS}$ may be set separately for the CSI-RS assumed by the user equipment that the transmission power is not 0 and the CSI-RS assumed by the user equipment that the transmission power is 0. The subframe that includes the CSI-RS may be expressed by the following Equation 12 (in Equation 12, $n_f$ is a system frame number, and $n_s$ is a slot number).

$$(10n_f+\lfloor n_s/2 \rfloor - \Delta_{CSI\text{-}RS}) \bmod T_{CSI\text{-}RS} = 0 \qquad \text{[Equation 12]}$$

A CSI-RS-Config information element (IE) defined as illustrated in Table 2 below may be used to specify CSI-RS configuration.

TABLE 2

CSI-RS-Config information elements

```
-- ASN1START
CSI-RS-Config-r10 ::=   SEQUENCE {
    csi-RS-r10              CHOICE {
        release                 NULL,
        setup                   SEQUENCE {
            antennaPortsCount-r10       ENUMERATED {an1, an2,
                                                    an4, an8},
            resourceConfig-r10          INTEGER (0..31),
            subframeConfig-r10          INTEGER (0..154),
            p-C-r10                     INTEGER (-8..15)
        }
    }                                           OPTIONAL,    --
Need ON
    zeroTxPowerCSI-RS-r10   CHOICE {
        release                 NULL,
        setup                   SEQUENCE {
            zeroTxPowerResourceConfigList-r10   BIT STRING (SIZE
            (16)),
            zeroTxPowerSubframeConfig-r10       INTEGER (0..154)
        }
    }                                           OPTIONAL    --
Need ON
}
-- ASN1STOP
```

In Table 2, the antenna port count parameter antennaPortsCount represents the number of antenna ports (that is, CSI-RS ports) used for CSI-RS transmission, and an1 corresponds to 1 and an2 corresponds to 2.

In Table 2, the p_C parameter represents a PDSCH EPRE (Energy Per Resource Element) to CSI-RS EPRE ratio assumed when the user equipment UE derives CSI feedback.

In Table 2, the resource configuration parameter resourceConfig has a value that determines a position of a resource element to which the CSI-RS is mapped on the RB pair as illustrated in FIG. 8.

In Table 2, the subframe configuration parameter subframeConfig corresponds to $I_{CSI\text{-}RS}$ in Table 1.

In Table 2, zeroTxPowerResourceConfigList and zeroTxPowerSubframeConfig respectively correspond to resourceConfig and subframeConfig for the CSI-RS of the transmission power of 0.

Details of the CSI-RS configuration IE in Table 2 will be understood with reference to the standard document TS 36.331.

Channel Status Information (CSI)

The MIMO scheme may be divided into an open-loop system and a closed-loop system. The open-loop MIMO scheme means that a MIMO transmitter performs MIMO transmission without feedback of channel status information from a MIMO receiver. The closed-loop MIMO scheme means that the MIMO transmitter performs MIMO transmission by using the channel status information fed back from the MIMO receiver. In the closed-loop MIMO scheme, each of the transmitter and the receiver may perform beamforming on the basis of the channel status information to obtain multiplexing gain of MIMO transmitting antennas. The transmitter (for example, base station) may allocate an uplink control channel or an uplink shared channel to the receiver (for example, user equipment), so that the receiver may feed the channel status information back.

The user equipment may perform estimation and/or measurement for a downlink channel by using the CRS and/or the CSI-RS. The channel status information (CSI) which is fed back from the user equipment to the base station may include a rank indicator (RI), a precoding matrix index (PMI), and a channel quality indicator (CQI).

The RI is information for a channel rank. The rank of the channel means a maximum number of layers (or streams) that may transmit different kinds of information through the same time-frequency resources. Since the rank value is mainly determined by long term padding of a channel, the rank value may generally be fed back in accordance with a longer period (that is, less frequently) than those of the PMI and the CQI.

The PMI is information for a precoding matrix used for transmission from the transmitter, and is a value that reflects spatial features of a channel. Precoding means that transmission layers are mapped into transmitting antennas, and layer-antenna mapping relation may be determined by a precoding matrix. The PMI corresponds to a precoding matrix index of the base station preferred by the user equipment on the basis of a metric such as a signal-to-interference plus noise ratio (SINR). In order to reduce feedback overhead of precoding information, the transmitter and the receiver previously share a codebook that includes various precoding matrixes, and only an index indicating a specific precoding matrix in the corresponding codebook may be fed back. For example, the PMI may be determined on the basis of RI which is reported most recently.

The CQI is the information indicating channel quality or channel strength. The CQI may be expressed by MCS combination which is previously determined. In other words, the CQI index represents a corresponding modulation scheme and a code rate. The CQI may be calculated by assuming that the PDSCH may be received without exceeding a predetermined error probability (for example, 0.1) on the assumption that a specific resource region (for example, region specified by valid subframe and/or physical resource block) is set to CQI reference resource and PDSCH transmission exists in the corresponding CQI reference resource. Generally, the CQI becomes a value that reflects received SINR that may be obtained if the base station configures a spatial channel by using the PMI. For example, the CQI may be calculated on the basis of RI and/or PMI which is reported most recently.

In the system (for example, LTE-A system) that supports extended antenna configuration, it is considered that additional multi-user diversity is acquired using a multi-user-MIMO (MU-MIMO) scheme. In case of the MU-MIMO scheme, since an interference channel exists between the user equipments multiplexed in an antenna domain, if the base station performs downlink transmission by using channel status information fed back from one of multiple user equipments, it is required that interference should not occur with the other user equipments. Accordingly, in order that MU-MIMO operation is performed normally, channel status information having exactness higher than that of the SU-MIMO scheme should be fed back.

A new CSI feedback method improved from CSI, which includes the existing RI, PMI and CQI, may be used such that the channel status information may be measured and reported more exactly. For example, the precoding information fed back from the receiver may be indicated by combination of two PMIs (for example, i1 and i2). As a result, more exact PMI may be fed back, and more exact CQI may be calculated and reported on the basis of the more exact PMI.

In the meantime, the CSI may periodically be transmitted through the PUCCH, or may aperiodically be transmitted through the PUSCH. Also, various report modes may be defined depending on which one of RI, first PMI (for example, W1), second PMI (for example, W2) and CQI is fed back and whether PMI and/or CQI which is fed back is for wideband (WB) or subband (SB).

CQI Calculation

Hereinafter, CQI calculation will be described in detail on the assumption that a downlink receiver is a user equipment. However, the description in the present invention may equally be applied to a relay as a downlink reception entity.

A method for configuring/defining a resource (hereinafter, referred to as reference resource), which becomes a reference of CQI calculation, when the user equipment reports CSI will be described. First of all, definition of CQI will be described in more detail.

The CQI reported by the user equipment corresponds to a specific index value. The CQI index is a value indicating a modulation scheme, code rate, etc., which correspond to the channel status. For example, the CQI indexes and their definition may be given as illustrated in Table 3.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on observation which is not limited by time and frequency, the user equipment may determine the highest CQI index, which satisfies a predetermined requirement of CQI indexes 1 to 15 of Table 3, for each CQI value reported at an uplink subframe n. The predetermined requirement may be defined that a single PDSCH transmission block, which reserves a group of downlink physical resource blocks referred to as CQI reference resources, may be received at a transmission block error probability that does not exceed 0.1 (that is, 10%), in accordance with combination of a modulation scheme (for example, MCS) and a transmission block size (TBS), which correspond to the corresponding CQI index. If the CQI index 1 does not satisfy the above requirement, the user equipment may determine CQI index 0.

In case of a transmission mode 9 (corresponding to maximum 8-layer transmission) and a feedback report mode, the user equipment may perform channel measurement for calculating a CQI value reported at an uplink subframe n, on the basis of the CSI-RS only. In case of the other transmission mode and corresponding report modes, the user equipment may perform channel measurement for CQI calculation on the basis of the CRS.

If the following requirements are all satisfied, combination of the modulation scheme and the transmission block size may correspond to one CQI index. The combination may be signaled for transmission on the PDSCH at the CQI reference resource in accordance with a related transmission block size table, the modulation scheme is indicated by the corresponding CQI index, and if combination of the transmission block size and the modulation scheme is applied to the reference resource, a valid channel code rate closest to a code rate indicated by the corresponding CQI index corresponds to the above requirement. If two or more combinations of the transmission block size and the modulation scheme are close to the code rate indicated by the corresponding CQI index at the same level, combination having the minimum transmission block size may be determined.

The CQI reference resource is defined as follows.

The CQI reference resource in the frequency domain is defined by a group of downlink physical resource blocks corresponding to a band to which the obtained CQI value is related.

The CQI reference resource in the time domain is defined by single downlink subframe n-nCQI_ref. In this case, in case of periodic CQI report, nCQI_ref is determined as a value which enables the downlink subframe n-nCQI_ref to correspond to a valid downlink subframe while being the smallest of values greater than 4. In case of aperiodic CQI report, nCQI_ref is determined as CQI reference resource which is the same downlink subframe as a valid downlink subframe corresponding to CQI request (or subframe for which CQI request is received) at an uplink DCI format (that is, PDCCH DCI format for providing uplink scheduling control information to the user equipment). Also, in case of aperiodic CQI report, nCQI_ref is 4 and the downlink subframe n-nCQI_ref corresponds to the valid downlink subframe, wherein the downlink subframe n-nCQI_ref may be received after the subframe corresponding to CQI request (or subframe for which CQI request is received) at a random access response grant. In this case, the valid downlink subframe means the downlink subframe that is set to the downlink subframe for the corresponding user equipment UE, is not the MBSFN subframe except the transmission mode 9, does not include a DwPTS field if the length of DwPTS is less than 7680*Ts (Ts=1/(15000×2048) second), and does not belong to a measurement gap configured for the corresponding UE. If there is no valid downlink subframe for the CQI reference resource, CQI report may be omitted for the uplink subframe n.

The CQI reference resource in a layer region is defined as random RI and PMI based on CQI.

In order that the user equipment derives CQI index from the CQI reference resource, the followings may be assumed: (1) first three OFDM symbols of the downlink subframe are used for control signaling; (2) there is no resource element used by a primary synchronization signal, a secondary synchronization signal or a physical broadcast channel; (3) the CQI reference resource has a CP length of non-MBSFN subframe; (4) redundancy version is 0; (5) if CSI-RS is used for channel measurement, a PDSCH EPRE to CSI-RS EPRE ratio has a predetermined value signaled by the upper layer; (6) PDSCH transmission scheme (single antenna port transmission, transmission diversity, spatial multiplexing, MU-MIMO, etc.) defined for each transmission mode is currently set for the corresponding UE (default mode may be provided); and (7) if CRS is used for channel measurement, the PDSCH EPRE to CRS EPRE ratio may be determined depending on a predetermined rule. Details related to CQI definition may be understood with reference to 3GPP TS36.213.

In short, the downlink receiver (for example, user equipment) may set a previous specific single subframe to the CQI reference resource based on the time when CQI calculation is currently performed, and may calculate CQI value from the corresponding CQI reference resource to satisfy the condition that error probability does not exceed 10% when the PDSCH is transmitted from the base station.

Codebook Based Precoding Scheme

Precoding for properly distributing transmission information in accordance with a channel status of each antenna may be used to support multi-antenna transmission. A codebook based precoding scheme means that a transmitter and a receiver previously defines a set of precoding matrixes, the receiver feeds the most suitable precoding matrix (that is, precoding matrix index (PMI)) back to the transmitter by measuring channel information from the transmitter, and the transmitter applies proper precoding to signal transmission on the basis of PMI. Since the codebook based precoding scheme selects a proper precoding matrix of the set of the precoding matrixes, although optimized precoding is always not used, feedback overhead may be reduced as compared with that optimized precoding information is explicitly fed back to actual channel information.

Figure 10:
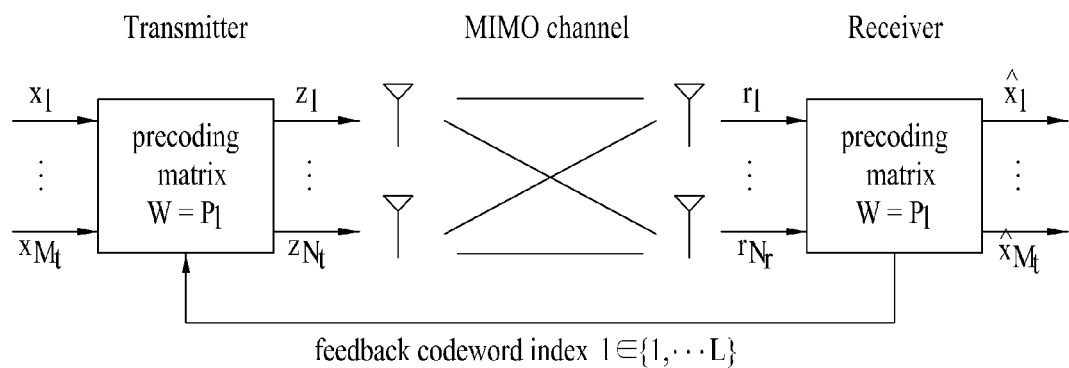
FIG. 10 is a diagram illustrating a basic concept of codebook based precoding.

FIG. 10 is a diagram illustrating a basic concept of codebook based precoding.

According to the codebook based precoding scheme, the transmitter and the receiver shares codebook information that includes a predetermined number of precoding matrixes which are previously determined in accordance with a transmission rank, the number of antennas, etc. In other words, if feedback information is finite, the precoding based codebook scheme may be used. The receiver may measure the channel status through a received signal and feed information on infinite number of preferred precoding matrixes (that is, indexes of corresponding precoding matrixes) back to the transmitter on the basis of the aforementioned codebook information. For example, the receiver may select an optimized precoding matrix by measuring the received signal in accordance with a maximum likelihood (ML) scheme or a minimum mean square error (MMSE) scheme. Although FIG. 10 illustrates that the receiver transmits precoding matrix information per codeword to the transmitter, the present invention is not limited to the example of FIG. 10.

The transmitter that has received feedback information from the receiver may select a specific precoding matrix from the codebook on the basis of the received information. The transmitter that has selected the precoding matrix may perform precoding in such a way to multiply layer signals equivalent to transmission ranks by the selected precoding matrix, and may transmit the precoded signals through a plurality of antennas. The transmitter may notify the receiver what precoding information applied to the transmitting signals is. The number of rows in the precoding matrix is the same as the number of antennas, and the number of columns is the same as the rank value. Since the rank value is the same as the number of layers, the number of columns is the same as the number of layers. For example, if the number of transmitting antennas is 4 and the number of transmission layers is 2, the precoding matrix may be configured as a 4×2 matrix. Information transmitted through each layer may be mapped into each antenna through the precoding matrix.

The receiver that has received the signal precoded by and transmitted from the transmitter may perform inverse processing of precoding performed by the transmitter and recover the received signals. Generally, since the precoding matrix satisfies a unitary matrix (U) condition such as $U*U^H=I$, the inverse processing of precoding may be performed in such a manner that a Hermit matrix $P^H$ of the precoding matrix P used for precoding of the transmitter is multiplied by the received signals.

For example, the following Table 4 illustrates a codebook used for downlink transmission that two transmitting antennas are used in the 3GPP LTE release-8/9, and the following Table 5 illustrates a codebook used for downlink transmission that four transmitting antennas are used in the 3GPP LTE release-8/9.

TABLE 4

| Codebook index | Number of rank | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers ν | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |

TABLE 5-continued

| Codebook index | $u_n$ | Number of layers $v$ | | | |
|---|---|---|---|---|---|
| | | 1 | 2 | 3 | 4 |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{\{s\}}$ is obtained by a set $\{s\}$ configured from Equation expressed as $W_n = I - 2u_n u_n^H / u_n^H u_n$. In this case, I represents a 4×4 single matrix, and $u_n$ is a value given by Table 5.

As illustrated in Table 4, a codebook for two transmitting antennas has a total of seven precoding vectors/matrixes. In this case, since the single matrix is intended for the open-loop system, a total of six precoding vectors/matrixes are obtained for precoding of the closed-loop system. Also, a codebook for four transmitting antennas as illustrated in Table 5 has a total of sixty-four precoding vectors/matrixes.

Additionally, in the system (for example, 3GPP LTE release-10 or advanced system) that supports extended antenna configuration, for example, MIMO transmission based on eight transmitting antennas may be performed. A codebook design for supporting MIMO transmission is required.

For CSI report for the channel transmitted through eight antenna ports, it may be considered that codebooks as illustrated in Table 6 to Table 13 are used. Eight CSI-RS antenna ports may be expressed as antenna port indexes 15 to 22. Each of Tables 6, 7, 8, 9, 10, 11, 12 and 13 illustrates an example of a codebook for 1-layer, 2-layer, 3-layer, 4-layer, 5-layer, 6-layer, 7-layer, and 8-layer CSI reports based on the antenna ports 15 to 22.

In Table 6 to Table 13, $\phi_n$ and $v_m$ may be given by the following Equation 13.

$$\phi_n = e^{j\pi n/2}$$

$$v_m = [1\ e^{j2\pi m/32}\ e^{j4\pi m/32}\ e^{j6\pi m/32}]^T \qquad [\text{Equation 13}]$$

TABLE 7

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4}\begin{bmatrix} v_m & v_{m'} \\ \varphi_n v_m & -\varphi_n v_{m'} \end{bmatrix}$

TABLE 6

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}}\begin{bmatrix} v_m \\ \varphi_n v_m \end{bmatrix}$

TABLE 8

| $i_1$ | $i_2$ | | | |
|---|---|---|---|---|
| | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |

| $i_1$ | $i_2$ | | | |
|---|---|---|---|---|
| | 4 | 5 | 6 | 7 |
| 0-3 | $W^{(3)}_{8i_1+2,8i_1+2,4i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |

| $i_1$ | $i_2$ | | | |
|---|---|---|---|---|
| | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| $i_1$ | $i_2$ | | | |
|---|---|---|---|---|
| | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$

TABLE 9

| $i_1$ | $i_2$ | | | |
|---|---|---|---|---|
| | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| $i_1$ | $i_2$ | | | |
|---|---|---|---|---|
| | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 10

| $i_1$ | $i_2$ |
|---|---|
| | 0 |
| 0-3 | $W^{(5)}_{i_1} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 11

| $i_1$ | $i_2$ |
|---|---|
| | 0 |
| 0-3 | $W^{(6)}_{i_1} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 12

| $i_1$ | $i_2$ |
|---|---|
| | 0 |
| 0-3 | $W^{(7)}_{i_1} = \frac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 13

| $i_1$ | $i_2$ |
|---|---|
| | 0 |
| 0 | $W^{(8)}_{i_1} = \frac{1}{8}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Multi-Antenna Array

FIG. 11 is a diagram illustrating examples constituting 8 transmitting antennas.

FIG. 11(a) illustrates that N number of antennas configures mutual independent channels without grouping. Gen erally, this antenna configuration will be referred to as ULA (Uniform Linear Array).

FIG. 11(b) illustrates ULA type antenna configuration of a pair of antennas (Paired ULA). In this case, the pair of antennas may have an associated channel therebetween and have an independent channel from another pair of antennas.

If a plurality of transmitting antennas should be installed in an insufficient space, ULA antenna configuration as illustrated in FIGS. 11(a) and 11(b) may not be appropriate. Accordingly, it may be considered that dual-pole (or cross-pole) antenna configuration as illustrated in FIG. 11(c) is used. If the transmitting antennas are configured in this way, although a distance d between the antennas is relatively short, an independent channel may be configured by lowering antenna correlation, whereby data transmission of high throughput may be performed.

In the example of FIG. 11(c), in array of a total of $N_T$ number of transmitting antennas, a group 1 of indexes 1, 2, . . . , $N_T/2$ and a group 2 of indexes $N_T/2+1$, $N_T/2+2$, . . . , $N_T$ may be configured to have polarizations orthogonal to each other. The antennas of the antenna group 1 may have the same polarization (for example, vertical polarization) and the antennas of the antenna group 2 may have another same polarization (for example, horizontal polarization). Also, the two antenna groups are co-located. For example, antenna 1 and $N_T/2+1$, antenna 2 and $N_T/2+2$, antenna 3 and $N_T/2+3$, . . . , antenna $N_T/2$ and $N_T$ may be co-located. In other words, the antennas within one antenna group have the same polarization like ULA (Uniform Linear Array), and correlation between the antennas within one antenna group has linear phase increment property. Also, correlation between the antenna groups has phase rotation property.

1-Dimensional Antenna Array and CSI Feedback 1-dimensional antenna array may include ULA or cross-pole antenna array configuration as illustrated in FIG. 11. If this 1-dimensional antenna array is used, the aforementioned reference signal transmission and CSI feedback method is used. In other words, in order to estimate the channel between the transmitter and the receiver (or base station and user equipment) in downlink transmission, the transmitter may transmit the reference signal (for example, CRS or CSI-RS) to the receiver, and the receiver may estimate the channel status based on the reference signal. The receiver may calculate rank, precoding weight value, and CQI based on the precoding weight value, which will be expected to be suitable for downlink data transmission, on the basis the channel information acquired through the reference signal.

For MIMO transmission such as precoded spatial multiplexing, precoding information may be required, wherein the precoding weight value may be configured in a type of codebook.

For example, in the MIMO system that uses four transmitting antennas (hereinafter, referred to as 4Tx), CSI feedback for precoded spatial multiplexing (SM) based on the CRS may be described as follows. When the base station having four transmitting antennas transmits the CRS, if it is assumed that indexes of antenna ports (AP) mapped into each RS are AP0, 1, 2 and 3, the user equipment may estimate the channels from AP0, 1, 2 and 3 by using the CRS.

In this case, if the matrix (or vector) that expresses the channel estimated by the user equipment is H, H=[$H_{11}$ $H_{12}$ $H_{13}$ $H_{14}$; $H_{21}$ $H_{22}$ $H_{23}$ $H_{24}$; . . . ; $H_{Nr1}$ $H_{Nr2}$ $H_{Nr3}$ $H_{Nr4}$] may be expressed. In other words, H may be expressed as Nr×Nt sized matrix (or vector). In this case, Nr is the number of receiving antennas, and Nt is the number of transmitting antennas.

Also, the user equipment may assume that the base station transmits data by using a precoding weight matrix (or vector) $W_m(k)$. In $W_m(k)$, m means a transmission rank, and k means index of the precoding weight matrix (or vector) defined for Rank-m. $W_m(k)$ may be expressed as $W_m(k)$= [$W_{11}$ $W_{12}$ $W_{13}$ . . . $W_{1m}$; $W_{21}$ $W_{22}$ $W_{23}$ . . . $W_{2m}$; $W_{31}$ $W_{32}$ $W_{33}$ . . . $W_{3m}$; . . . ; $W_{41}$ $W_{42}$ $W_{43}$ . . . $W_{4m}$]. That is, $W_m(k)$ may be expressed as Nt×m sized matrix (or vector).

Also, the user equipment may calculate an equivalent channel $H_{eq}$. The equivalent channel $H_{eq}$ may be calculated by synthesis of the estimated channel H and the precoding weight value $W_m(k)$ (that is, $H_{eq}=HW_m(k)$), or may be calculated by synthesis of a Covariance Matrix R of the estimated channel and the precoding weight value $W_m(k)$ (that is, $H_{eq}=RW_m(k)$). The user equipment may select rank and precoding weight value, which are suitable for downlink transmission, on the basis of the equivalent channel $H_{eq}$. Also, the user equipment may calculate CQI expected when the selected rank and precoding weight value are used.

For another example, in the MIMO system that uses eight transmitting antennas (hereinafter, referred to as 8Tx), CSI feedback for precoded spatial multiplexing (SM) based on the CSI-RS may be described as follows. When the base station having eight transmitting antennas transmits the CSI-RS, if it is assumed that indexes of antenna ports (AP) mapped into each RS are AP15, 16, 17, 18, 19, 20, 21, 22, the user equipment may estimate the channels from AP15, 16, 17, 18, 19, 20, 21, 22 by using the CSI-RS.

In this case, if the matrix (or vector) that expresses the channel estimated by the user equipment is H, H=[$H_{11}$ $H_{12}$ $H_{13}$ $H_{14}$ $H_{15}$ $H_{16}$ $H_{17}$ $H_{18}$; $H_{21}$ $H_{22}$ $H_{23}$ $H_{24}$ $H_{25}$ $H_{26}$ $H_{27}$ $H_{28}$; . . . ; $H_{Nr1}$ $H_{Nr2}$ $H_{Nr3}$ $H_{Nr4}$ $H_{Nr5}$ $H_{Nr6}$ $H_{Nr7}$ $H_{Nr8}$] (wherein Nr is the number of receiving antennas) may be expressed.

Also, the user equipment may assume that the base station transmits data by using a precoding weight matrix (or vector) $W_m(k)$. $W_m(k)$ may be expressed as $W_m(k)$=[$W_{11}$ $W_{12}$ $W_{13}$ . . . $W_{1m}$; $W_{21}$ $W_{22}$ $W_{23}$ . . . $W_{2m}$; $W_{31}$ $W_{32}$ $W_{33}$ . . . $W_{3m}$; . . . ; $W_{81}$ $W_{82}$ $W_{83}$ . . . $W_{8m}$].

Also, the user equipment may select rank and precoding weight value, which are suitable for downlink transmission, on the basis of the equivalent channel $H_{eq}$ (wherein, the equivalent channel is calculated by $H_{eq}=HW_m(k)$ or $H_{eq}=RW_m(k)$), and may calculate CQI expected when the selected rank and precoding weight value are used.

Accordingly, in the MIMO system that supports Nt number of transmitting antennas, the user equipment may feed CSI (for example, RI, PMI, CQI), which is selected/calculated using the CRS or CSI-RS as described above, back to the base station. The base station may determine rank, precoding weight value, and modulation and coding scheme, which are suitable for downlink transmission, by considering the CSI reported by the user equipment.

2-Dimensional Antenna Array and CSI Feedback

FIG. 12(a) illustrates ULA which is an example of 1-dimensional antenna configuration, and FIG. 12(b) illustrates URA (Uniform Rectangular Array) which is an example of 2-dimensional antenna configuration.

In the example of ULA of FIG. 12(a), N number of antennas are arranged at an interval of $d_r$. A weave for ULA may be expressed as a vector $k_p$. $\omega_p$ represents a direction of the vector $k_p$, and corresponds to an azimuth angle on a x-y plane.

A steering vector represents a set of phase delays suffered by the wave, wherein the set of phase delays is determined by antennas belonging to the antenna array. If the steering vector is $a_r$, the following Equation may be expressed.

$$\varphi_p = \frac{d_r}{\lambda}\cos(\psi_p)$$

$$a_r(\varphi_p) = [\,1\quad e^{-j2\pi\varphi_p}\quad e^{-j2\pi 2\varphi_p}\quad \ldots \quad e^{-j2\pi(N-1)\varphi_p}\,]^T$$

[Equation 14]

In the above Equation 14, λ represents a wavelength. The steering vector $a_r$ is defined by N×1 sized complex vector, and each of N number of elements of $a_r$ represents relative phase at each of the antennas of ULA.

In the example of URA of FIG. 12(b), the antennas are arranged 2-dimensionally on a x-z plane. URA may be referred to as UPA (Uniform Planar Array). This 2-dimensional antenna structure is suggested as a method for arranging so many antennas, and may be used for massive MIMO for maximizing advantages of the existing MIMO technology.

URA of FIG. 12(b) includes N×M number of antennas. The N×M number of antennas are arranged on an x axis at an interval of $d_r$, and on a z axis at an interval of $d_c$. A direction of a wave vector $k_p$ of URA may be expressed by an azimuth angle $\psi_p$ on a x-y plane and an elevation angle $\sigma_p$ on a y-z plane. Also, a steering matrix for URA may be expressed by the following Equation.

$$\theta_p = \frac{d_c}{\lambda}\sin(\vartheta_p)$$

$$\varphi_p = \frac{d_r}{\lambda}\cos(\psi_p)\cos(\vartheta_p)$$

$$a_c(\theta_p) = [\,1\quad e^{-j2\pi\theta_p}\quad e^{-j2\pi 2\theta_p}\quad \ldots \quad e^{-j2\pi(M-1)\theta_p}\,]^T$$

$$a_r(\varphi_p) = [\,1\quad e^{-j2\pi\varphi_p}\quad e^{-j2\pi 2\varphi_p}\quad \ldots \quad e^{-j2\pi(N-1)\varphi_p}\,]^T$$

$$A(\theta_p,\varphi_p) = a_c(\theta_p)\cdot a_r(\varphi_p)^T$$

[Equation 15]

In the above Equation 15, $A(\theta_p,\phi_p)$ represents a steering matrix. The steering matrix $A(\theta_p,\phi_p)$ is defined as N×M sized complex matrix, and each of N×M number of elements represents relative phase at each of the antennas of URA.

A beam formed by the 1-dimensional antenna structure like the existing ULA is specified by the azimuth angle (for example, horizontal domain) only and cannot be specified by the elevation angle (for example, vertical domain), whereby 2-dimensional beamforming is only supported. This 1-dimensional antenna structure (for example, ULA or cross-pole array configuration) may support adaptive beamforming or spatial multiplexing in a direction of the azimuth angle, and MIMO transmission and reception scheme for the 1-dimensional antenna structure is only designed in the existing wireless communication system (for example, system based on 3GPP LTE release-8, 9, 10 and 11).

In the meantime, if 2-dimensional antenna structure (for example, URA) based MIMO transmission and reception scheme, which is intended to improve system throughput, is supported, the beam formed by the 2-dimensional antenna structure may be specified in the direction of the azimuth angle and the direction of the elevation angle, whereby 3-dimensional beamforming may be performed.

FIG. 13 is a diagram illustrating examples of beamforming based on 2-dimensional antenna configuration.

FIG. 13(a) illustrates examples of sector specific beamforming formed by restricting a certain range of the azimuth angle and a certain range of the elevation angle. FIG. 13(b) illustrates examples of UE-specific beamforming formed by varying the elevation angle on the same azimuth angle.

According to the function of forming the beam by specifying the azimuth angle and the elevation angle as described above, sector specific elevation beamforming (for example, vertical pattern beamwidth and/or downtilt based adaptive control), improved sectorization in the vertical domain, and new beamforming such as user (or UE)-specific elevation beamforming may be supported.

Vertical sectorization may increase average system throughput through gain of a vertical sector pattern, and does not require support of additional standard technology.

UE-specific elevation beamforming may improve SINR to the corresponding UE by designating a vertical antenna pattern. On the other hand, unlike vertical sectorization or sector-specific vertical beamforming, UE-specific elevation beamforming requires support of additional standard technology. For example, in order to normally support 2-dimensional port structure, CSI measurement and feedback method of the UE for UE-specific elevation beamforming will be required.

In order to support UE-specific elevation beamforming, a downlink MIMO improvement method will be required. Examples of the downlink MIMO improvement method may include improvement (for example, new codebook design, method for supporting codebook selection/update/modification, minimization of CSI payload size increase, etc.) of CSI feedback method of the UE, change of CSI-RS configuration for UE-specific elevation beamforming, definition of additional antenna ports for UE-specific elevation beamforming, and improvement (for example, method for obtaining common channel coverage and/or RRM (Radio Resource Management) measurement reliability if the number of antenna ports is increased) of downlink control operation for supporting UE-specific elevation beamforming.

Also, in designing the improved downlink MIMO operation, various factors such as base station (eNB) antenna calibration error (error on phase and time), estimation error, downlink overhead, complexity, feedback overhead, backward compatibility, actual UE realization, reuse of the existing feedback framework, and subband to wideband feedback may be considered.

Method for Transmitting Reference Signal to Support 2-Dimensional Antenna Structure The present invention suggests a method for transmitting a reference signal and a CSI feedback method to normally and efficiently support schemes such as UE-specific elevation beamforming and vertical sectorization, which may be performed by the 2-dimensional antenna structure.

In the existing system, a beam direction is fixed in a vertical direction (that is, vertical direction of beam cannot be selected/adjusted), and horizontal beamforming may be performed. The base station command the UE to perform CSI-RS configuration and transmit the CSI-RS based on the CSI-RS configuration to the UE, so that the UE may report CSI, which includes PMI, etc., to the base station, thereby determining the most appropriate horizontal beamforming. The command to perform the CSI-RS configuration means that one or more of information (for example, CSI-RS port, CSI-RS transmission timing, CSI-RS transmission RE position, etc.) included in the CSI-RS-Config IE of Table 2 is provided.

For 3-dimensional beamforming, vertical beamforming (or selection of vertical beam) is required additionally to the existing horizontal beamforming, and a detailed method for additional vertical beamforming has not been defined yet.

In order to describe the basic principle of the present invention, 2-dimensional URA (or UPA) may be assumed by combination of ULA of a first domain (for example, horizontal domain) and ULA of a second domain (for example, vertical domain). For example, 3-dimensional beam may be formed in such a manner that the azimuth angle is determined in the horizontal domain after the elevation angle is determined in the vertical domain, or the elevation angle is determined in the vertical domain after the azimuth angle is determined in the horizontal domain. In this 2-dimensional antenna structure, selection of ULA for any one of the first and second domains may be referred to as regional selection or domain selection.

Also, in 3-dimensional beamforming, one dimension may be determined by a static or long-term, and the other two dimensions may be determined by a dynamic or short-term. For example, a beam of a specific direction in the vertical domain may be determined and beamforming of the horizontal domain according to the existing beamforming technology may be performed for the corresponding vertical beam, whereby the 3-dimensional beam may be formed.

For example, it is assumed that N number of beamformings may be available vertically and M number of beamformings may be available horizontally in a planar array that includes K×L number of antennas. In this case, one dominant beam of the N number of vertical beam patterns may be determined, and one beam may be selected from the M number of horizontal beam patterns, whereby the 3-dimensional beam may be formed. At this time, if L number of antennas of the horizontal domain are equivalent to the number of antennas of the MIMO system which is conventionally designed (for example, L=2, 4, 8), the existing feedback codebook may be used for CSI feedback for horizontal beamforming.

As described above, in the 2-dimensional antenna structure, vertical beamforming (or elevation beamforming) may be performed together with horizontal beamforming (or azimuth beamforming). If vertical beamforming is added to the existing horizontal beamforming, a new method for CSI determination/calculation (that is, determination of rank and precoding weight value (or precoding matrix) and CQI calculation) and a method for transmitting a reference signal will be required.

Also, the MIMO system having the 2-dimensional antenna structure may perform vertical sectorization and at the same time perform horizontal beamforming To this end, the method for transmitting a reference signal and a new method for CSI determination/calculation will be required.

In order to describe the method for transmitting a reference signal used to acquire channel status information in the MIMO system having the 2-dimensional antenna structure, the 2-dimensional antenna structure is assumed, in which Ntv number of antennas are arranged in the vertical domain and Nth number of antennas are arranged in the horizontal domain. In this 2-dimensional antenna structure, the base station has a total of Nt (Nt=Ntv×Nth) number of antennas. In order that the UE estimates the channel transmitted from the Nt number of antennas of the base station, the base station may allocate and transmit the reference signal to each of the Nt number of antennas.

FIGS. 14 and 15 are diagrams illustrating a method for allocating antenna port numbers in a 2-dimensional antenna structure.

FIG. 14 illustrates an example of a total of 16 antennas (that is, 2×8 antenna structure) that include 8 columns in a horizontal direction and 2 rows in a vertical direction.

FIG. 14(a) illustrates an example of counting antenna port numbers in a horizontal first manner. In the example of FIG. 14(a), for a total of 16 antennas (that is, 2×8 antenna structure) that include 8 columns in a horizontal direction and 2 rows in a vertical direction, antenna port numbers p, p+1, p+7 are sequentially allocated to eight antennas in a horizontal direction of the first row, if there is no antenna to which antenna port number will be allocated in a horizontal direction, antenna port numbers p+8, p+9, p+15 are sequentially allocated to eight antennas of the second row in a vertical direction.

FIG. 14(b) illustrates an example of counting antenna port numbers in a vertical first manner. In the example of FIG. 14(b), antenna port numbers p, p+1 are sequentially allocated to two antennas in a vertical direction of the first column, if there is no antenna to which antenna port number will be allocated in a vertical direction, antenna port numbers p+2, p+3 are sequentially allocated to two antennas of the second column in a vertical direction. In this way, the antenna port numbers are allocated to a total of 16 antennas in accordance with a vertical first manner.

FIG. 15 illustrates an example of a total of 16 antennas (that is, 4×4 antenna structure) that include 4 columns in a horizontal direction and 4 rows in a vertical direction. FIG. 15(a) illustrates an example of counting antenna port numbers in a horizontal first manner. FIG. 15(b) illustrates an example of counting antenna port numbers in a vertical first manner.

In the MIMO system to which the aforementioned 2-dimensional antenna structure is applied, in order that the receiver determines/calculates channel status information of the channel formed from the 2-dimensional antenna structure, the reference signal suitable for the 2-dimensional antenna structure should be transmitted from the transmitter. Hereinafter, examples of the present invention for reference signal configuration suitable for the 2-dimensional antenna structure will be described.

Method 1

According to the method 1 of the present invention, reference signal configuration for channel estimation of the 2-dimensional antenna structure may be defined by reuse or modification of the CSI-RS configuration defined in the 3GPP LTE release-10 or 11.

The above Table 2 illustrates configuration of the CSI-RS-Config IE defined in the 3GPP LTE release-10 or 11. For example, in the system according to the release-10, a CSI-RS pattern for supporting 1, 2, 4 or 8Tx antenna ports has been defined. As illustrated in FIG. 8, on one resource block pair, one of 32 patterns may be used for 2Tx antenna port CSI-RS, one of 16 patterns may be used for 4Tx antenna port CSI-RS, and one of 8 patterns may be used for 8Tx antenna port CSI-RS.

Also, as illustrated in Table 1, for configuration for a subframe at which the CSI-RS is transmitted, one of 155 combinations of period and offset for which the CSI-RS is transmitted, may be used.

Also, the CSI-RS is power boosted in accordance with a p_C parameter value, wherein the same power boosting value is applied to each antenna port.

CSI-RS configuration of the existing 3GPP LTE release-10/11 may be used by being corrected to CSI-RS configuration for the 2-dimensional antenna structure as follows.

Method 1-1

If the 2-dimensional antenna structure has maximum 8 Tx antennas, CSI-RS configuration of the 3GPP LTE release-10/11 may be used by modification.

In other words, CSI-RS resource for the 2-dimensional antenna structure may be allocated using the CSI-RS configuration of the 3GPP LTE release-10/11. However, since the CSI-RS configuration of the 3GPP LTE release-10/11 has been designed for the 1-dimensional antenna structure, if the feedback codebook for the 1-dimensional antenna structure is used for the CSI-RS for the 2-dimensional antenna structure, maximization of throughput cannot be expected. Accordingly, the feedback codebook for the 2-dimensional antenna structure should newly be designed.

Also, if the CSI-RS configuration for the 1-dimensional antenna structure and the CSI-RS configuration for the 2-dimensional antenna structure are provided in the same IE type, it is required to identify the CSI-RS configuration for the 1-dimensional antenna structure and the CSI-RS configuration for the 1-dimensional antenna structure from each other. For example, if the transmission mode (or 3-dimensional beamforming transmission mode) based on the 2-dimensional antenna structure is defined as a new transmission mode (for example, TM11), it may be indicated explicitly or implicitly that the feedback codebook (or feedback codebook for 3-dimensional beamforming) for the 2-dimensional antenna structure should be used if TM11 is set.

The feedback codebook for the 2-dimensional antenna structure may be configured similarly to the existing 8Tx codebook (for example, Tables 6 to 13) of the 1-dimensional antenna structure. However, since precoding vectors/matrixes suitable for the property of the 2-dimensional antenna structure should be included in the codebook, the existing codebook cannot be used as it is.

First of all, factors constituting the existing 8Tx rank-1 codebook (Table 6) of the 1-dimensional antenna structure are defined to depend on the principle of a precoding vector W as expressed by the following Equation 16.

$$W = \begin{bmatrix} W1 \\ aW1 \end{bmatrix}$$ [Equation 16]

In the Equation 16, the factor W1 constituting the vector W1 is defined as expressed by the following Equation 17.

$$W1 = \frac{1}{\sqrt{N_T}} e^{j2\pi nk/N}$$ [Equation 17]

In the Equation 17, $N_T$ is the number of transmitting antennas. N means the number of beams, n has a value of 0, 1, 2, ..., N−1, and k has a value of 0, 1, 2, ..., $N_T/2$−1. For example, the vector W1 of the Equation 16 may be a 4×1 sized vector corresponding to $(1/\sqrt{8}) \times v_m$ of the Equation 13 and Table 6. In W, W1 is applied to antenna indexes 1, 2, ..., $N_T/2$ (that is, //// pole antennas in FIG. 11(c)) in a 1-dimensional cross pole antenna structure of FIG. 11 (c), aW1 is applied to antenna indexes $N_T/2$+1, $N_T/2$+2, ..., $N_T$ (that is, \\\\ pole antennas in FIG. 11(c)), and phase difference between / pole antenna and \ pole antenna is compensated by a ∈{ 1,−1,j,−j}.

Figure 16:
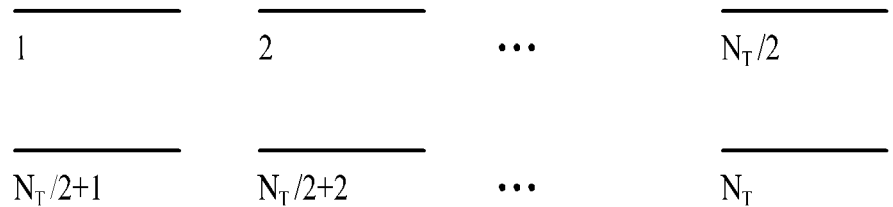
FIG. 16 is a diagram illustrating an example of 2-dimensional antenna array.

FIG. 16 is a diagram illustrating an example of 2-dimensional antenna array.

In design of the feedback codebook for 2-dimensional antenna array, the precoding vector W defined as expressed by the following Equation 18 may be used, wherein the Equation 18 is modified from the Equation 16 which is the basic Equation used for the 8Tx codebook design of the 1-dimensional antenna structure.

$$W = \begin{bmatrix} W1 \\ aW2 \end{bmatrix}$$ [Equation 18]

In case of 1-dimensional cross pole antenna array, the same precoding vector W1 is applied to a first antenna group (antenna indexes 1, 2, ..., $N_T/2$) and a second antenna group (antenna indexes $N_T/2$+1, $N_T/2$+2, ..., $N_T$). On the other hand, in case of 2-dimensional antenna array, W1 is applied to a first antenna group (antenna indexes 1, 2, ..., $N_T/2$), whereas W2 different from W1 is applied to a second antenna group (antenna indexes $N_T/2$+1, $N_T/2$+2, ..., $N_T$). In 2-dimensional antenna array, as the precoding vector applied to the first antenna group, a value which is not the same as, but similar to, the precoding vector applied to the second antenna group may be used. In more detail, the values of the vectors applied to the first antenna group and the second antenna group may be modified due to elevational beamforming. For example, W1 and W2 may be defined as expressed by the following Equation 19.

$$W1 = \frac{1}{\sqrt{N_T}} e^{j2\pi nk/N}$$
$$W2 = \frac{1}{\sqrt{N_T}} e^{j2\pi bnk/N}$$ [Equation 19]

As expressed by the above Equation 19, W1 and W2 are different from each other in that whether a value of b has been used or not. Also, the value of b is defined by a value determined based on 'a' which is a combining value. For example, the value of b may be defined as expressed by the following Equation 20.

$$b = \sqrt{1-a^2}$$ [Equation 20]

The factors (that is, precoding vectors/matrixes) which will be included in the feedback codebook for supporting the 2-dimensional antenna structure may be configured on the basis of the precoding vector W which is defined as above. If the transmission mode for supporting the 2-dimensional antenna structure is set, the UE may use the precoding vectors/matrixes on the codebook newly defined as above when selecting/calculating CSI.

Method 1-2

Resource configuration resourceConfig for vertical antennas may be indicated explicitly while CSI-RS configuration is being indicated on the basis of horizontal antennas.

In more detail, it is defined that a value of antennaPortsCount parameter {an1, an2, an4, an8, ... } indicated by the CSI-RS-Config IE indicates the number of antennas (for example, L in K×L antenna array) of the horizontal domain in the 2-dimensional antenna array. In case of the 2-dimensional antenna array, since the same number of antennas of the horizontal domain exist in each row, one antennaPortsCount parameter exists.

Next, the resourceConfig parameter indicated by the CSI-RS-Config IE is set to have one value of ranges (for example, in case of an2, 0 to 31) determined in accordance with the antennaPortsCount value. In this case, a plurality of resourceConfig parameters may be included in the 2-dimensional antenna array. For example, if two antennas exist in the vertical domain, index indicating a resource element position (that is, CSI-RS pattern) where antennaPortsCount number of antennas of the first row will be arranged may be indicated by resourceConfig A parameter, and index indicating a resource element position where antennaPortsCount number of antennas of the second row will be arranged may be indicated by resourceConfig B parameter.

As described above, the CSI-RS-Config IE for the 2-dimensional antenna array may be configured as illustrated in Table 14 below. Table 14 corresponds to a part of Table 2, and in Table 14, portions the same as Table 2 are omitted, and modified/added portions from Table 2 are marked with underlines.

TABLE 14

| ... | |
|---|---|
| antennaPortsCount-rxx | ENUMERATED {an1, an2, an4, an8}, |
| resourceConfig-rxx A | INTEGER (0..31), |
| resourceConfig-rxx B | INTEGER (0..31), |
| subframeConfig-rxx | INTEGER (0..154), |
| p-C-rxx | INTEGER (−8..15) |
| ... | |

If four antennas exist in the vertical domain, four resourceConfig parameters may be included in the CSI-RS-Config IE. In this way, the resourceConfig parameters equivalent to the number of antennas in the vertical domain may be included in the CSI-RS-Config IE. For example, if Ntv number of antennas exist in the vertical domain, Ntv number of resourceConfig parameters may be included in the CSI-RS-Config IE. As a result, the user equipment UE may know that the corresponding CSI-RS configuration is for the 2-dimensional antenna array of Ntv×antennaPortsCount number of antennas.

Method 1-3

A parameter for vertical antennas may be indicated additionally while CSI-RS configuration is being indicated on the basis of horizontal antennas.

It is defined that a value of antennaPortsCount parameter {an1,an2,an4,an8, . . . } indicated by the CSI-RS-Config IE indicates the number of antennas (for example, Ntv in Ntv×Nth antenna array) of the horizontal domain in the 2-dimensional antenna array. In case of the 2-dimensional antenna array, since the same number of antennas of the horizontal domain exist in each row, one antennaPortsCount parameter exists.

In order to indicate the number of antennas in the vertical domain, a VantennaPortsCount parameter is additionally defined. If the number of antennas in the vertical domain is indicated by the VantennaPortsCount parameter, resources equivalent to the number of antennas in the vertical domain should be allocated additionally.

The resources which are allocated additionally may be indicated implicitly by the resourceConfig parameter indicated by the CSI-RS-Config IE. For example, a predetermined offset value mapped into the value of the VantennaPortsCount parameter is added to the index value indicated by the resourceConfig parameter, whereby resources corresponding to a resultant value may be determined as the resources which are allocated additionally.

As described above, the CSI-RS-Config IE for the 2-dimensional antenna array may be configured as illustrated in Table 15 below. Table 15 corresponds to a part of Table 2, and in Table 15, portions the same as Table 2 are omitted, and modified/added portions from Table 2 are marked with underlines.

TABLE 15

| ... | |
|---|---|
| antennaPortsCount-rxx | ENUMERATED {an1, an2, an4, an8}, |
| resourceConfig-rxx | INTEGER (0..31), |
| VantennaPortsCount-rxx | ENUMERATED {an1, an2, an4, an8}, |
| subframeConfig-rxx | INTEGER (0..154), |
| p-C-rxx | INTEGER (−8..15) |
| ... | |

According to the example of Table 15, for example, if the antennaPortsCount parameter indicates an4 and the resourceConfig parameter indicates a value of 0, a resource element position corresponding to index 0 is selected from CSI-RS resources defined for 4Tx. And, if the VantennaPortsCount parameter indicates an2, it may be determined that two antennas exist in the vertical domain (that is, 2×4 antenna array). It is assumed that an offset value mapped when the VantennaPortsCount parameter is an2 is Offset2. In this case, a resource element position (that is, CSI-RS pattern) corresponding to index (0+Offset2) may be selected in addition to the CSI-RS resource element position corresponding to index 0. For example, in case of Offset2=1, a CSI-RS resource element position corresponding to index 1 may be selected additionally. Accordingly, a resource element pattern corresponding to index 0 may be determined for CSI-RS transmission for four horizontal domain antennas of the first row in the vertical domain, and a resource element pattern corresponding to index 1 may be determined for CSI-RS transmission for four horizontal domain antennas of the second row in the vertical domain.

Also, if the antennaPortsCount parameter indicates an4 and the VantennaPortsCount parameter indicates an2, the UE may recognize that the base station performs 8Tx antenna transmission, and may use a transmission method and/or channel measurement method, which is defined for 8Tx antenna transmission.

For example, if the antennaPortsCount parameter indicates an4 and the resourceConfig parameter indicates 0, a resource element position corresponding to index 0 is selected from the CSI-RS resources defined for 4Tx. If the VantennaPortsCount parameter indicates an4, it may be determined that four antennas exist in the vertical domain (that is, 4×4 antenna array). It is assumed that an offset value mapped when the VantennaPortsCount parameter is an24 is Offset4. In this case, a resource element position (that is, CSI-RS pattern) corresponding to index (0+Offset4) may be selected in addition to the CSI-RS resource element position corresponding to index 0. For example, the value of Offset4 may be 1, 2 and 3. Accordingly, a resource element pattern corresponding to index 0 may be determined for CSI-RS transmission for four horizontal domain antennas of the first row in the vertical domain, a resource element pattern corresponding to index 1 may be determined for CSI-RS transmission for four horizontal domain antennas of the second row in the vertical domain, a resource element pattern corresponding to index 2 may be determined for CSI-RS transmission for four horizontal domain antennas of the third row in the vertical domain, and a resource element pattern corresponding to index 4 may be determined for CSI-RS transmission for four horizontal domain antennas of the fourth row in the vertical domain.

Also, if the antennaPortsCount parameter indicates an4 and the VantennaPortsCount parameter indicates an4, the UE may recognize that the base station performs 16Tx antenna transmission, and may use a transmission method and/or channel measurement method, which is defined for 16Tx antenna transmission.

Method 2

For reference signal transmission for channel estimation in the 2-dimensional antenna structure, CSI-RS configuration for the horizontal domain and CSI-RS configuration for the vertical domain may be indicated. That is, CSI-RS configuration may be configured in accordance with a target or usage of the CSI-RS.

The following Table 16 illustrates an example of configuration information on the CSI-RS for vertical domain antennas.

TABLE 16

| ... | |
|---|---|
| VantennaPortsCount-rxx | ENUMERATED {an1, an2, an4, an8}, |
| VresourceConfig-rxx | INTEGER (0..31), |
| VsubframeConfig-rxx | INTEGER (0..154), |
| p-C-rxx | INTEGER (−8..15) |
| ... | |

The base station may configure CSI-RS configuration for antennas of the vertical domain as illustrated in Table 16 and notify the UE of the CSI-RS configuration. Accordingly, the UE may receive the CSI-RS based on the notified CSI-RS configuration and perform channel estimation by using the received CSI-RS. The channel estimated by the UE is the channel for antennas of the vertical domain. The UE may select a precoding vector preferred for the estimated channel and report the selected precoding vector to the base station. The base station may perform vertical beamforming for the corresponding UE by considering the reported precoding vector.

Also, configuration information on the CSI-RS for horizontal domain antennas may be configured as illustrated in Table 17 below.

TABLE 17

| ... | |
|---|---|
| HantennaPortsCount-rxx | ENUMERATED {an1, an2, an4, an8}, |
| HresourceConfig-rxx | INTEGER (0..31), |
| HsubframeConfig-rxx | INTEGER (0..154), |
| p-C-rxx | INTEGER (−8..15) |
| ... | |

The base station may configure CSI-RS configuration for antennas of the horizontal domain as illustrated in Table 17 and notify the UE of the CSI-RS configuration. Accordingly, the UE may receive the CSI-RS based on the notified CSI-RS configuration and perform channel estimation by using the received CSI-RS. The channel estimated by the UE is the channel for antennas of the horizontal domain. The UE may select a precoding vector preferred for the estimated channel and report the selected precoding vector to the base station. The base station may perform horizontal beamforming for the corresponding UE by considering the reported precoding vector.

In this case, if the UE receives the CSI-RS for antennas of the vertical domain and reports CSI for vertical beamforming to the base station and the base station determines vertical beamforming based on the reported CSI, the base station may notify the UE of CSI-RS configuration for antennas of the horizontal domain by assuming the status based on the determined vertical beamforming. In other words, The base station determines optimized horizontal beamforming based on vertical beamforming without determining horizontal beamforming regardless of a direction of vertical beamforming. That is, the base station may notify the UE of CSI-RS configuration in the horizontal domain based on vertical beamforming and finally determine horizontal beamforming by considering CSI feedback reported from the UE. Accordingly, the base station may determine final 3-dimensional beamforming considering both vertical beamforming and horizontal beamforming.

Also, determination of horizontal beamforming based on vertical beamforming may be applied favorably when CSI-RS configuration and/or transmission for antennas in the vertical domain is performed by a static or long-term and CSI-RS configuration and/or transmission for antennas in the horizontal domain is performed by a dynamic or short-term. That is, CSI-RS configuration for antennas in the vertical domain may be changed or provided less frequently than CSI-RS configuration for antennas in the horizontal domain. Also, the CSI-RS for antennas in the vertical domain may be transmitted less frequently than the CSI-RS for antennas in the horizontal domain. In this case, a value of CSI-RS subframe period determined by the VsubframConfig parameter of Table 16 may be set to a value greater than that of CSI-RS subframe period determined by the HsubframConfig parameter of Table 17.

Method 3

For reference signal transmission for channel estimation in the 2-dimensional antenna structure, multiple CSI-RS configurations may be configured.

Multiple CSI-RS configurations means that beamforming of any one of the horizontal and vertical domains is determined by the precoding vector previously determined by the base station (that is, beamforming is not determined based on CSI feedback of UE), and beamforming of the other one domain is determined based on the precoding vector selected and reported by the UE in accordance with CSI-RS configuration and transmission from the base station. In other words, multiple CSI-RS configurations for determining beamforming of the second domain may be configured in a state that beamforming of the first domain is previously determined.

For example, in case of vertical domain sectorization, multiple CSI-RS configurations may be configured for one azimuth angle. In this case, the base station may notify the UE of a plurality of CSI-RS configurations for vertical beamforming after determining one azimuth angle (that is, beamforming of horizontal domain is applied in accordance with a previously determined requirement). The UE may determine CSI-RS reception, channel estimation, and precoding vector in accordance with each of the plurality of CSI-RS configurations. As a result, a plurality of precoding vectors corresponding to the plurality of CSI-RS configurations may be determined, and the UE may select a preferred one of the plurality of precoding vectors and report the selected precoding vector to the base station. The base station may perform vertical beamforming for the plurality of CSI-RS configurations by considering the precoding vector reported by the UE.

For example, the precoding vector for multiple CSI-RS configurations for one azimuth angle may include eight elements as illustrated in Table 18 below. In Table 18, H means a channel value of each of eight antenna ports, and h means a channel value for a antenna port set (that is, one antenna port sent includes four antenna ports) obtained by synthesis of two of eight antenna ports. For example, h11, h12, h13 and h14 represent channel values for the first antenna port set that includes four antenna ports. Also, h21, h22, h23 and h24 represent channel values for the second antenna port set that includes another four antenna ports. Channel properties as illustrated in the example of Table 18 may be generated when different vertical beams are applied to the first and second antenna port sets. The UE may select a preferred one of eight elements and report the selected element to the base station.

TABLE 18

| h11 = (H1 + H5) | h12 = (H2 + H6) | h13 = (H3 + H7) | h14 = (H4 + H8) |
|---|---|---|---|
| h21 = (H1 − H5) | h22 = (H2 − H6) | h23 = (H3 − H7) | h24 = (H4 − H8) |

Alternatively, multiple CSI-RS configurations may be configured for one elevation angle. In this case, the base station may notify the UE of a plurality of CSI-RS configurations for horizontal beamforming after determining one elevation angle (that is, beamforming of vertical domain is applied in accordance with a previously determined requirement). The UE may determine CSI-RS reception, channel estimation, CSI selection/calculation and CSI report in accordance with each of the plurality of CSI-RS configurations. As a result, the base station may select a proper one of a plurality of CSIs (or a plurality of precoding vectors) reported by the UE for a plurality of CSI-RS configurations and perform horizontal beamforming by using the selected CSI.

Figure 17:
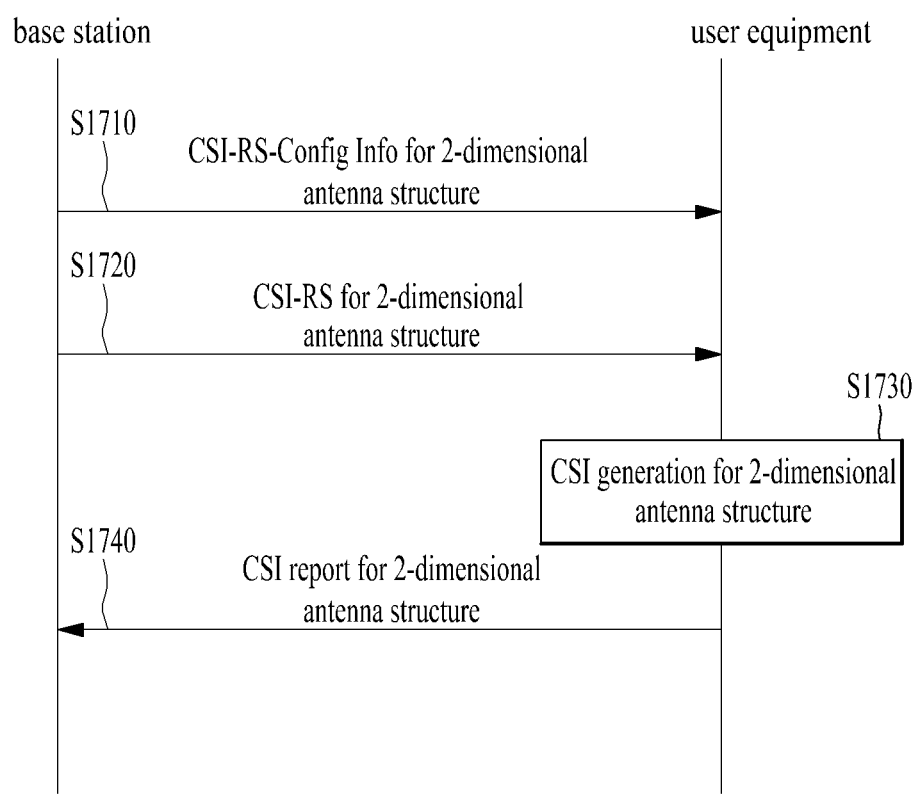
FIG. 17 is a flow chart illustrating CSI-RS related operation for a 2-dimensional antenna structure according to the present invention.

FIG. 17 is a flow chart illustrating CSI-RS related operation for a 2-dimensional antenna structure according to the present invention.

At step S1710, the base station may configure CSI-RS configuration information for the 2-dimensional antenna structure and provide the configured CSI-RS configuration information to the base station. The CSI-RS configuration information may be configured by one or combination of at least two of the details described in the various embodiments of the present invention.

At step S1720, the base station may transmit the CSI-RS for the 2-dimensional antenna structure to the user equipment. The user equipment may receive the CSI-RS for the 2-dimensional antenna structure on the basis of the CSI-RS configuration information provided from the base station at step S1710.

At step S1730, the user equipment may estimate the channel by using the received CSI-RS and generate CSI for the channel formed by the 2-dimensional antenna structure of the base station. The operation of generating CSI for the 2-dimensional antenna structure of the base station may be configured by one or combination of at least two of the details described in the various embodiments of the present invention.

At step S1740, the user equipment may report the generated CSI to the base station.

Figure 18:
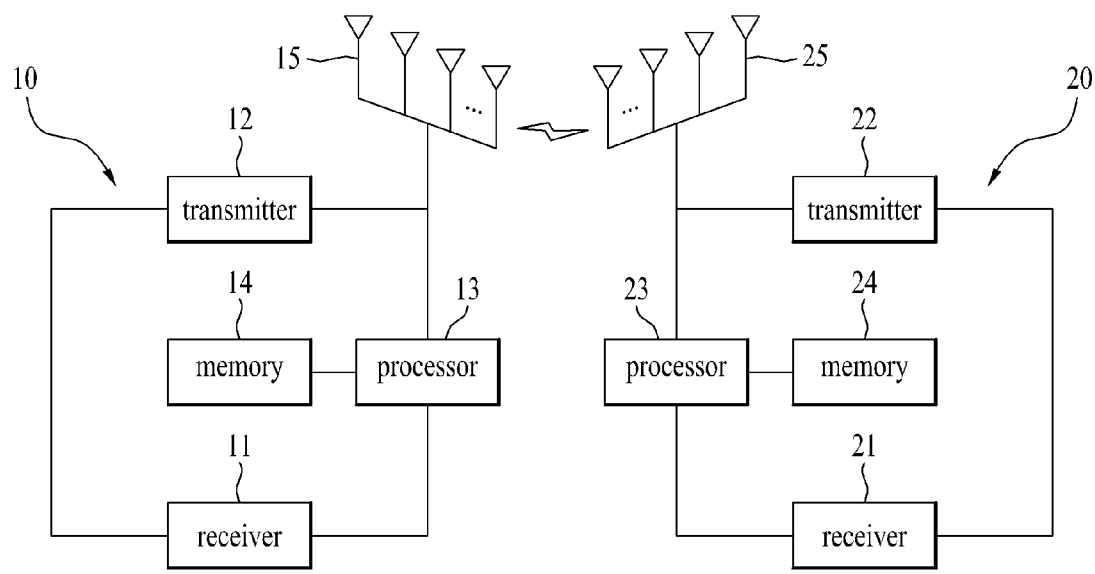
FIG. 18 is a diagram illustrating a base station and a user equipment according the preferred embodiment of the present invention.

FIG. 18 is a diagram illustrating a base station and a user equipment according the preferred embodiment of the present invention.

Referring to FIG. 18, a base station 10 according to the present invention may include a transmitter 11, a receiver 12, a processor 13, a memory 14, and a plurality of antennas 15. The transmitter 11 may transmit various signals, data and information to an external device (for example, user equipment). The receiver 10 may receive various signals, data and information from the external device (for example, user equipment). The processor 13 may control the overall operation of the base station 10. The plurality of antennas 15 may be configured in accordance with the 2-dimensional antenna structure.

The processor 13 of the base station 10 according to the embodiment of the present invention may be configured to configure CSI-RS configuration information, which will be provided to the user equipment, in accordance with the embodiments suggested in the present invention, transmit CSI-RS on the basis of the CSI-RS configuration information, and receive CSI generated by the user equipment. In addition, the processor 13 of the base station 10 performs a function of operation-processing information received by the base station 10 and information to be transmitted to the external device. The memory 14 may store the operation-processed information for a predetermined time, and may be replaced with a buffer (not shown).

Referring to FIG. 18, a user equipment 20 according to the present invention may include a transmitter 21, a receiver 22, a processor 23, a memory 24, and a plurality of antennas 25. The plurality of antennas 25 mean user equipments that support MIMO transmission and reception. The transmitter 21 may transmit various signals, data and information to an external device (for example, base station). The receiver 20 may receive various signals, data and information from the external device (for example, base station). The processor 23 may control the overall operation of the user equipment 20.

The processor 23 of the user equipment 20 according to the embodiment of the present invention may be configured to receive CSI-RS on the basis of CSI-RS configuration information provided from the base station in accordance with the embodiments suggested in the present invention, and generate and report CSI for the 2-dimensional antenna structure of the base station by using the received CSI-RS. In addition, the processor 23 of the user equipment 20 performs a function of operation-processing information received by the user equipment 20 and information to be transmitted to the external device. The memory 24 may store the operation-processed information for a predetermined time, and may be replaced with a buffer (not shown).

The details of the aforementioned user equipment 20 may be configured in such a manner that the aforementioned various embodiments of the present invention may independently be applied thereto, or two or more embodiments may simultaneously be applied thereto. The repeated description of the details of the user equipment 20 will be omitted for clarification.

Also, in the description of the various embodiments of the present invention, the base station has been described as a downlink transmission entity or uplink reception entity, and the user equipment has been described as a downlink reception entity or uplink transmission entity. However, the scope of the present invention is not limited to the above example. For example, the description of the base station may equally be applied to a case where a cell, an antenna port, an antenna port group, RRH, a transmission point, a reception point, an access point or a relay becomes a downlink transmission entity to the user equipment or an uplink reception entity from the user equipment. Also, the principle of the present invention described through the various embodiments of the present invention may equally be applied to even a case where the relay becomes a downlink transmission entity to the user equipment or an uplink reception entity from the user equipment, or a case where the relay becomes an uplink transmission entity to the base station or a downlink reception entity from the base station.

The aforementioned embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments according to the present invention may be applied to various wireless communication systems.

The invention claimed is:

1. A method for reporting channel state information (CSI) from a user equipment (UE) in a wireless communication system, the method comprising:
    receiving a channel state information-reference signal (CSI-RS) by the UE based on CSI-RS configuration information provided by a base station; and
    determining a CSI based on the CSI-RS by the UE,
    reporting the determined CSI to the base station by the UE,
    wherein the determined CSI includes precoding information selected from a predetermined codebook,
    wherein elements of the predetermined codebook are configured based on a precoding vector $$W = \begin{bmatrix} W1 \\ aW2 \end{bmatrix}$$

when the CSI is a CSI of a 2 dimensional (2D) antenna structure, W1 is a precoding vector applied to a first linear antenna group of the 2D antenna structure, W2 is a precoding vector applied to a second linear antenna group of the 2D antenna structure, and
    wherein "a" is a value representing phase difference between the first linear antenna group and the second linear antenna group,
wherein the W2 is obtained by modifying the W1.

2. The method according to claim 1, wherein $$W1 = \frac{1}{\sqrt{N_T}} e^{j2\pi nk/N}, W2 = \frac{1}{\sqrt{N_T}} e^{j2\pi bnk/N},$$

$N_T$ is the number of transmitting antennas, n=0, 1, 2, ..., N−1, k=0, 1, 2, ..., $N_T/2−1$, N is the number of beams and b is a decimal.

3. The method according to claim 2, wherein "b" is determined based on "a".

4. The method according to claim 2, wherein $b=\sqrt{1-a^2}$.

5. The method according to claim 1, wherein the CSI-RS configuration information includes an antenna port count parameter and Ntv number of resource configuration parameters when the CSI-RS configuration information is indicated based on horizontal antennas,
    the antenna port count parameter indicates the number of antennas of the first linear antenna group and second linear antenna group, and the Ntv corresponds to the number of vertical antennas.

6. The method according to claim 1, wherein the CSI-RS configuration information includes a first antenna port count parameter, a second antenna port count parameter and a resource configuration parameter when the CSI-RS configuration information is indicated based on horizontal antennas,
    the first antenna port count parameter indicates the number of antennas of the first linear antenna group,
    the second antenna port count parameter indicates the number of antennas of the second linear antenna group,
    and the resource configuration parameter indicates a resource element location of the CSI-RS for the first linear antenna group corresponding to one antenna of the second linear antenna group.

7. The method according to claim 6, wherein a resource element location of the CSI-RS for the first linear antenna group corresponding to each of the other antennas of the second linear antenna group is determined based on an offset value corresponding to a value of the second antenna port count parameter.

8. A user equipment (UE) for reporting channel state information (CSI) in a wireless communication system, the user equipment comprising:
    a receiver;
    a transmitter; and
    a processor,
    wherein the processor is configured to:
    control the receiver to receive a channel state information-reference signal (CSI-RS) based on CSI-RS configuration information that is provided by a base station, and
    determine a CSI based on the CSI-RS, control the transmitter to report the CSI to the base station,
wherein the determined CSI includes precoding information selected from a predetermined codebook, elements of the predetermined codebook are configured based on a precoding vector $$W = \begin{bmatrix} W1 \\ aW2 \end{bmatrix}$$

when the CSI is a CSI of a 2 dimensional (2D) antenna structure, W1 is a precoding vector applied to a first linear antenna group of the 2D antenna structure, W2 is a precoding vector applied to a second linear antenna group of the 2D antenna structure, and
wherein "a" is a value representing phase difference between the first domain antenna group and the second domain antenna group,
wherein the W2 is obtained by modifying the W1.

* * * * *